(12) United States Patent
Nocon et al.

(10) Patent No.: US 11,907,431 B2
(45) Date of Patent: Feb. 20, 2024

(54) GESTURE RECOGNITION DEVICE WITH MINIMAL WAND FORM FACTOR

(71) Applicant: Warner Bros. Entertainment Inc., Burbank, CA (US)

(72) Inventors: Nathan Nocon, Valencia, CA (US); Jonathan Hsu, Yorba Linda, CA (US); Michael Goslin, Sherman Oaks, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 242 days.

(21) Appl. No.: 17/547,395

(22) Filed: Dec. 10, 2021

(65) Prior Publication Data

US 2022/0100280 A1    Mar. 31, 2022

Related U.S. Application Data

(63) Continuation-in-part of application No. PCT/US2020/049372, filed on Sep. 4, 2020.
(Continued)

(51) Int. Cl.
*G06F 3/01* (2006.01)
*A63H 33/22* (2006.01)
(Continued)

(52) U.S. Cl.
CPC ............. *G06F 3/017* (2013.01); *A63F 9/24* (2013.01); *A63H 33/22* (2013.01); *G06F 3/016* (2013.01);
(Continued)

(58) Field of Classification Search
None
See application file for complete search history.

(56) References Cited

U.S. PATENT DOCUMENTS 9,497,819 B2    11/2016  Van et al.
10,222,868 B2    3/2019  Martinez Fernandez et al.
(Continued)

FOREIGN PATENT DOCUMENTS

EP       3007030 A1    4/2016
KR   10-2017-0035547 A   3/2017
(Continued)

OTHER PUBLICATIONS

Corrected Notice of Allowance for U.S. Appl. No. 17/547,351 dated Mar. 1, 2023.
(Continued)

*Primary Examiner* — Jason T Yen
(74) *Attorney, Agent, or Firm* — ALSTON & BIRD LLP

(57) ABSTRACT

Provided is a gesture-recognition (GR) device that includes a printed circuit board (PCB) and a controller. The circuit board has an aspect ratio exceeding a threshold value that corresponds to at least a 70 percent difference between length and width of the PCB. The PCB includes a first unit and a second unit. The first unit corresponds to a base unit to be grasped by hand of a user. The second unit corresponds to an elongate unit that extends outward from the first unit. The second unit is characterized by a minimal wand form factor. A rigid strength of the second unit is based on at least a shape of an outer shell and a structural attribute of the second unit. The controller controls illumination of a plurality of light sources mounted on the second unit of the circuit board based on assertion signals.

20 Claims, 14 Drawing Sheets

Related U.S. Application Data

(60) Provisional application No. 63/250,315, filed on Sep. 30, 2021, provisional application No. 62/897,220, filed on Sep. 6, 2019.

(51) Int. Cl.
| | |
|---|---|
| *A63F 9/24* | (2006.01) |
| *G06V 40/10* | (2022.01) |
| *G06V 40/20* | (2022.01) |
| *G06F 3/0346* | (2013.01) |
| *G06F 3/041* | (2006.01) |
| *G06F 3/044* | (2006.01) |
| *A63H 30/04* | (2006.01) |

(52) U.S. Cl.
CPC ............ *G06F 3/0346* (2013.01); *G06F 3/044* (2013.01); *G06F 3/0416* (2013.01); *G06V 40/10* (2022.01); *G06V 40/28* (2022.01); *A63F 2009/2447* (2013.01); *A63F 2009/2454* (2013.01); *A63F 2250/485* (2013.01); *A63H 30/04* (2013.01); *A63H 2200/00* (2013.01); *G06F 2203/04104* (2013.01)

(56) References Cited

U.S. PATENT DOCUMENTS

| | | | |
|---|---|---|---|
| 10,281,987 | B1 | 5/2019 | Yang et al. |
| 11,003,307 | B1 | 5/2021 | Ravasz et al. |
| 11,021,098 | B1 | 6/2021 | Brown et al. |
| 11,086,475 | B1 | 8/2021 | Ravasz et al. |
| 11,422,669 | B1 | 8/2022 | Ravasz et al. |
| 2004/0204240 | A1* | 10/2004 | Barney .................. A63J 21/00 463/36 |
| 2010/0134308 | A1* | 6/2010 | Barnardo ............. G06F 1/3203 340/8.1 |
| 2011/0199292 | A1 | 8/2011 | Kilbride |
| 2013/0328762 | A1 | 12/2013 | Mcculloch et al. |
| 2013/0328763 | A1 | 12/2013 | Latta et al. |
| 2014/0092011 | A1 | 4/2014 | De Foras et al. |
| 2014/0139454 | A1 | 5/2014 | Mistry et al. |
| 2014/0240102 | A1 | 8/2014 | Kawash et al. |
| 2014/0267184 | A1 | 9/2014 | Bathiche et al. |
| 2015/0105159 | A1 | 4/2015 | Palotas |
| 2015/0185713 | A1 | 7/2015 | Glickfield et al. |
| 2015/0346834 | A1 | 12/2015 | Fernandez et al. |
| 2015/0363034 | A1 | 12/2015 | Hinckley et al. |
| 2016/0011668 | A1 | 1/2016 | Gilad-Bachrach et al. |
| 2016/0091980 | A1 | 3/2016 | Baranski et al. |
| 2017/0064169 | A1 | 3/2017 | Mishra et al. |
| 2017/0087453 | A1* | 3/2017 | Poisner .................. A63F 13/23 |
| 2017/0123515 | A1 | 5/2017 | Ha et al. |
| 2017/0308173 | A1 | 10/2017 | Youn et al. |
| 2018/0085673 | A1* | 3/2018 | Birkedal ................ A63F 13/35 |
| 2018/0101231 | A1 | 4/2018 | Seth |
| 2019/0014048 | A1 | 1/2019 | Singuru |
| 2019/0325651 | A1 | 10/2019 | Bradner et al. |
| 2019/0369755 | A1 | 12/2019 | Roper et al. |
| 2019/0380801 | A1 | 12/2019 | Savall et al. |
| 2019/0380802 | A1 | 12/2019 | Savall et al. |
| 2020/0042111 | A1 | 2/2020 | Connellan et al. |
| 2020/0081516 | A1 | 3/2020 | Zyskind et al. |
| 2020/0261815 | A1 | 8/2020 | Neal |
| 2021/0034188 | A1 | 2/2021 | Kwon et al. |
| 2021/0252386 | A1 | 8/2021 | VanWyk et al. |
| 2022/0100280 | A1 | 3/2022 | Nocon et al. |
| 2023/0113991 | A1 | 4/2023 | Ang et al. |

FOREIGN PATENT DOCUMENTS

| | | |
|---|---|---|
| WO | 2011057287 A1 | 5/2011 |
| WO | 2017/052077 A1 | 3/2017 |

OTHER PUBLICATIONS

Examination Report for GB Application No. 2205006.6 dated Nov. 25, 2022.

Notice of Allowance for U.S. Appl. No. 17/547,351 dated Feb. 22, 2023.

International Preliminary Report on Patentability Under Chapter I, for International Application No. PCT/US2020/049372, dated Mar. 17, 2022, (9 pages), The International Bureau of WIPO, Geneva, Switzerland.

International Search Report and Written Opinion for International Application No. PCT/US2020/049732, dated Dec. 1, 2020, (10 pages), Korean Intellectual Property Office, Daejeon, Republic of Korea.

Combined Search and Examination Report Under Sections 17 and 18(3) for Great Britain Patent Application No. GB2305231.9, dated Oct. 5, 2023, (5 pages), Intellectual Property Office, South Wales, United Kingdom.

Communication Pursuant to Rule 164(1) EPC, Partial Supplementary European Search Report for Patent Application No. 20861529.4, dated Oct. 6, 2023, (13 pages), European Patent Office, Munich, Germany.

Notice of Allowance and Fees Due for U.S. Appl. No. 17/547,483, dated Oct. 12, 2023, (8 pages), United States Patent and Trademark Office, US.

* cited by examiner

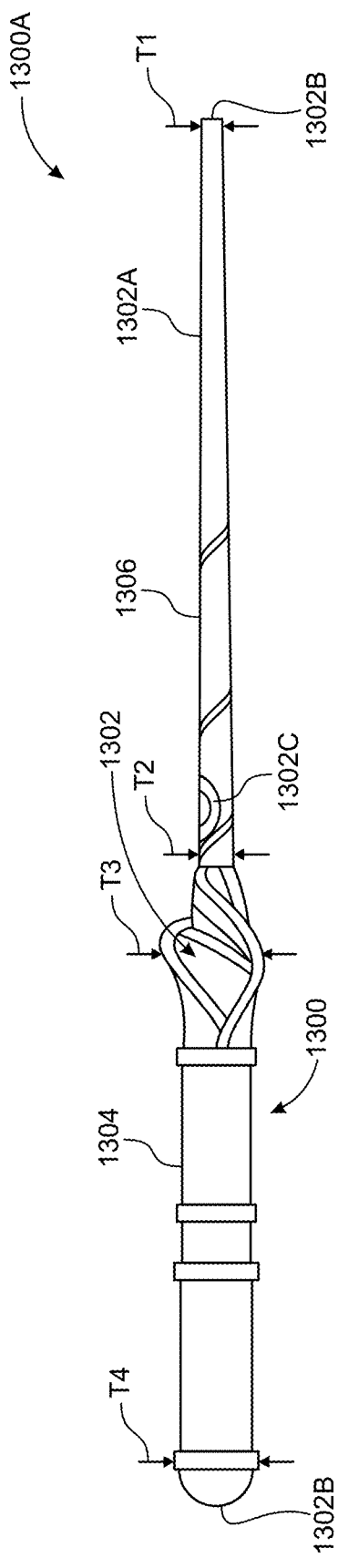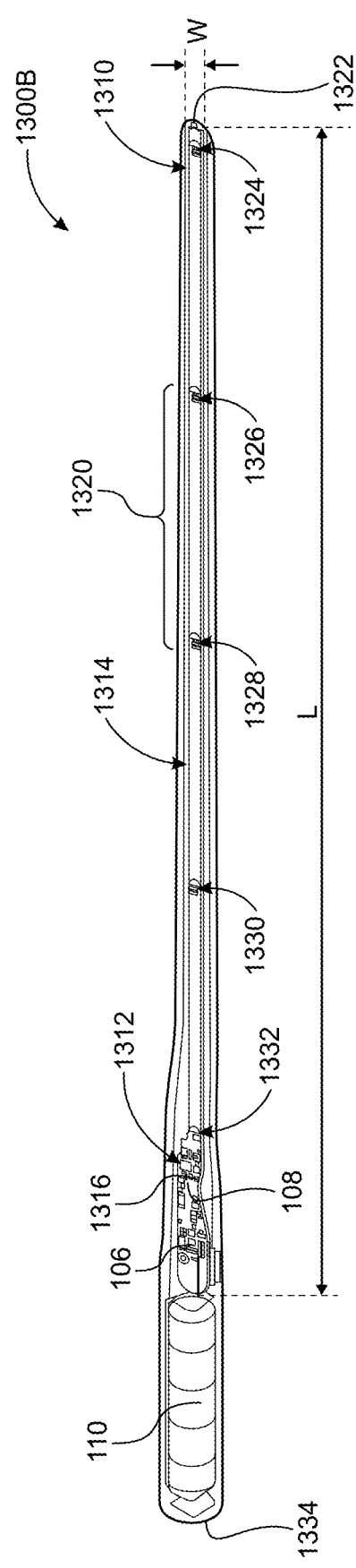
FIG. 13A
FIG. 13B

GESTURE RECOGNITION DEVICE WITH MINIMAL WAND FORM FACTOR

CROSS-REFERENCE TO RELATED APPLICATION

This patent application claims priority to, and the benefit from, and is a continuation-in-part of International Application No. PCT/US20/49372, filed on Sep. 4, 2020, and which claims priority to U.S. Provisional Application No. 62/897,220, filed on Sep. 6, 2019. The present application also claims priority to U.S. Provisional Application No. 63/250,315, filed on Sep. 30, 2021.

Each of the above referenced patent applications is hereby incorporated herein by reference in its entirety.

FIELD

The present application relates to machine-human interfaces, and more particularly to apparatus, systems and methods for enabling gesture-centric control input for computer processes, and related applications. Further, certain embodiments of the disclosure relate to a gesture recognition device with minimal wand factor.

BACKGROUND

Various user interface devices have been developed for interacting with machines, especially computers, by detecting movement of a body part or hand-held device.

A first type uses sensors to detect body movement using a wireless sensor, for example an infrared sensor.

A second type relies on sensing movement of a sensor that is attached to or grasped by the user. For example, pointing devices, e.g., an electronic mouse, can detect movement in two dimensions, depending on the model. Smartphones and similar devices include position and orientation sensors that can sense movement of the device for input to any application the device can run. Handheld controllers for virtual reality translate hand movement into virtual hand movement in a virtual space.

Toy electronic wands that emit light or tactile vibration when grasped or waved about are also available. These toys lack the ability to control external devices. The user receives the mere pleasure of observing light or tactile emission from the wand. Such toy wands may use light pipes for illumination having the light sources at one end that illuminate the entire electronic wand. Such layered pipes require separate illumination for each of the pipes, which results in such electronic wands compromising on rigid strength and also becoming prohibitively expensive. Further, the brightness of such electronic wands may not be optimal as there is a trade-off between the material of the outer plastic and the paint coatings.

It is desirable to develop new methods, apparatus, and systems for gesture-centric user interfaces, that enable users to control a variety of electronic devices or perform a variety of actions in the real world with gestures.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a gesture-recognition (GR) device made to be held or worn by a user includes an electronic processor configured by program instructions in memory to recognize a gesture. As used herein, a "gesture" is a pattern of movements, such as, for example, up-and-down, side-to-side, inward-outward and/or any combination thereof. The movements may be of a sensor integrated with an associated prop. In an aspect, a movement sensor is attached to (e.g., incorporated into the electronics of) the GR device. In another aspect, the GR device is capable of sensing 3-dimensional motion with up to six degrees of freedom (three linear axes, and three rotational axes), plus three axes of geospatial orientation if desired, using the movement sensor (e.g., an inertial measurement unit (IMU)).

To recognize a gesture, the processor of the gesture-recognition (GR) device detects a pattern of movements, classifies the pattern to a type or rejects it as unclassifiable, and associates the type (if any) to an electronic instruction. It may perform any or all these operations locally or remotely, using a heuristic algorithm, a rules-based algorithm, or a combination of heuristic and rules-based algorithm. In an aspect, the processor may access a library comprising a plurality of action identifiers associated with a plurality of gesture types to identify an action associated with the recognized gesture type from a library. As used herein, an "action" includes user-directed changes in machine states, for example, illuminating a light, extinguishing a light, retrieving content, playing content, jumping ahead or backwards in content, opening a door, or any of the innumerable things that a machine controlled by an electronic processor can do. In the context of a data library, an "action identifier" is data that enables the action to be identified, for example, a pointer, an instruction set or module, or other identification code. In a related aspect, the processor, or a processor of an associated interface device, may include instructions that enable a user to edit the associations between action identifiers and gesture types.

In another aspect, the processor of the GR device, or another in communication with it, may send a signal to one or more targeted ancillary devices, causing each ancillary device to execute instructions performing the identified action. For example, the processor may execute instructions to perform the identified action that include electronically transmitting signals to a second electronic processor located in a second device. The second device may be, or may include, at least one of a light, a television, a projector, a refrigerator, a personal smart device, an appliance, a virtual reality device, an augmented reality device, a display device, or a toy.

In related aspects, the gesture recognition device may include a light emitting device (LED), wherein the action may include altering a characteristic of light emitted from the LED device, such as, for example, its color, flashing rate, or intensity. The gesture recognition device may include an inertial measurement unit (IMU) configured to detect gestures in three-dimensional space, including gestures having six degrees of freedom (3 linear, 3 rotational) or less, plus three axes of geospatial orientation if desired. The electronic processor is configured to recognize the gesture based on signals received from the inertial measurement unit.

In some embodiments, classifying gestures by type and associating the action identifiers and gesture types may be done remotely, e.g., by a remote server or a mobile device, while characterizing a movement pattern as digital data is done by a processor of device that undergoes the movement. Thus, the GR device may initiate the first critical process in gesture recognition—converting a gesture into a wireless, machine-readable signal that can be characterized by type—without performing later operations in a chain of causation between a gesture by the user and an action by a target device. In other embodiments, the GR device may perform later operations in the chain of causation, up to but not including performing the action itself. The GR device may also perform local actions, for example, emitting sounds, vibrations, or lights, synchronized to the action performed by the targeted device. In an aspect, the GR device may perform local actions indicating other outcomes, such as a failure to classify a gesture of a recognizable type, or a failure to communicate an action identifier to a targeted device. In addition, the GR device may perform local actions indicating intermediate states, for example successful input of a gesture to type.

In other aspects, a system for providing a personalized experience may include a central electronic processor at a central location, an edge electronic processor near a first location, and a plurality of connected devices at the first location, wherein the central processor is configured to send instructions to control the plurality of connected devices at the first location to create a personalized experience for a user at the first location. The plurality of connected devices may include at least one of a user arrival notification system, a light, a mirror, a television, a projector, a virtual reality device, an augmented reality device, a speaker or a microphone.

The system may further include, in a computer memory, encoded information about capabilities of the plurality of connected devices at the first location. The information about capabilities of the plurality of connected devices at the first location may be in a database accessible by the central processor. In such embodiments, the central processor is configured to send instructions to control the plurality of connected devices at the first location to create a personalized experience for a user at the first location based on the capabilities of the plurality of connected devices at the first location. As used herein, a "personalized experience" means sensory output from the connected devices that is configured based on information defined by or for an individual user indicative of the user's preferences for the sensory output.

In an alternative, or in addition, the information about capabilities of the plurality of connected devices at the first location may be in a database accessible by the edge processor. In such embodiments, the central processor may be configured to send instructions to control the plurality of connected devices at the first location assuming full capabilities of the plurality of connected devices and the edge processor may be configured to receive the instructions and provide a personalized experience for a user at the first location based on the instructions and on capabilities of the plurality of connected devices at the first location to command a personalized experience for a user at the first location.

In an aspect, a GR device may be, or may be locally connected to, an edge processor of the system. The personalized experience may include controlling the plurality of connected devices at the first location according to a gesture-recognition library defined by of for a user of the GR device. In an aspect, an edge processor or the central processor may translate between In accordance with another aspect of the disclosure, the GR device may comprise a memory for storing instructions and a processor for executing the instructions to perform a method. The method may comprise controlling illumination of a plurality of light sources mounted on a second unit of a circuit board based on assertion signals. The circuit board may comprise a first unit and the second unit. The circuit board may have an aspect ratio exceeding a threshold value. The threshold value may correspond to at least 70 percent difference between length and width of the circuit board. The first unit corresponds to a base unit configured to be grasped by hand of a user. The second unit corresponds to an elongate unit that extends outward from the first unit. The second unit may be configured to have a minimal wand form factor. Rigid strength of the second unit may be based on at least a shape of an outer shell and a structural attribute of the second unit.

In accordance with an embodiment, the outer shell mounted on the second unit may illuminate based on the controlled illumination of the plurality of light sources.

In accordance with an embodiment, a first attribute for the minimal wand form factor may correspond to a minimum number of electronic components mounted on the second unit as compared to the first unit.

In accordance with an embodiment, a second attribute for the minimal wand form factor may correspond to usage of electric components with minimum complexity and cost.

In accordance with an embodiment, the structural attribute of the second unit may correspond to a miniaturized ladder pattern formed by via structures and copper fills along edges of the second unit.

In accordance with an embodiment, the method further comprising routing power signals to the plurality of light sources through the miniaturized ladder pattern along edges of the second unit.

In accordance with an embodiment, light rays generated by the plurality of light sources may undergo continuous bouncing between the inner walls of the outer shell and top and the bottom surfaces of the second unit to which a solder mask is applied. The continuous bouncing of the light rays may result in maximum diffusion of the light rays and maximum illumination.

In accordance with an embodiment, the body of the outer shell may comprise two hollow translucent side members that are clam-shelled and secured together along with the second unit in middle by using a fastening mechanism. Boundaries of the hollow translucent side members are ultrasonically welded to form a continuous translucent member with a regular shape.

In accordance with an embodiment, body of the outer shell may be injection melded, slid onto the second unit, secured together by a fastening mechanism, and ultrasonically welded to form a continuous translucent member with a regular shape.

In accordance with an embodiment, each light source from the plurality of light sources may be configured to illuminate a corresponding hollow channel that is a portion of the outer shell.

In accordance with an embodiment, outer surface of the outer shell may be frosted and textured such that light rays are leaked and diffused at the outer surface of the outer shell.

In accordance with an embodiment, the outer shell may be formed using a polymer blend with one of a first, a second or a third variation. The first variation of the polymer blend is clear and frosted. The second variation of the polymer blend is 50-90% translucent with a color tint. The third variation of the polymer blend is 50-90% translucent and mixed with silicon powder to increase light diffusion.

In accordance with an embodiment, the plurality of light sources correspond to right-angled light emitting diodes (LEDs) facing towards a tip of the second unit.

In accordance with an embodiment, the plurality of light sources are mounted as pairs of light sources on both top and bottom surfaces of the second unit.

In accordance with an embodiment, a first location of a first light source of a pair of light sources mounted on the top surface may be above a second location of a second light source of the pair of light sources mounted on the bottom surface for uniform illumination.

In accordance with an embodiment, a degree of translucency of the outer shell may be based on the material of the outer shell and coatings of paint applied on top and/or bottom surfaces of the outer shell.

In accordance with an embodiment, a boundary outline of the GR device may be determined based on a combination of a contour of the first unit and the second unit of the circuit board and a flex printed circuit. The contour of the first unit and the second unit of the circuit board is one of a straight contour, an offset contour or a curved contour based on the one or more key contour elements. The one or more key contour elements may correspond to an inner curvature, a corner radius, and a profile of the circuit board.

In accordance with another aspect of the disclosure, a circuit board may comprise a first unit that corresponds to a base unit configured to be grasped by hand of a user, and a second unit that corresponds to an elongate unit extends outward from the first unit. The first unit and the second unit may be configured to have a minimal wand form factor. The first unit and the second unit form an integral unit having an aspect ratio exceeding a pre-defined threshold value. Rigid strength of the second unit is based on at least a shape of an outer shell and a structural attribute of at least the second unit. A plurality of light sources mounted on the second unit is configured to be illuminated based on assertion signals.

In accordance with an embodiment, the structural attribute of the second unit may correspond to a miniaturized ladder pattern along edges of the second unit formed by via structures and copper fills. The illumination of the plurality of light sources may be controlled by a controller. Power and light source control signals may be routed to the plurality of light sources between the miniaturized ladder pattern along edges of the second unit for the controlled illumination.

In accordance with an embodiment, light rays generated by the plurality of light sources undergo continuous bouncing between inner walls of the outer shell and surface of the second unit to which a solder mask is applied. The continuous bouncing of the light rays results in maximum diffusion of the light rays and maximum illumination.

As used herein, a "client device" or "device" includes at least a computer processor coupled to a memory and to one or more ports, including at least one input port and at least one output port (e.g., a desktop computer, laptop computer, tablet computer, smartphone, PDA, etc.), including accessories such as wands, rings, and staffs so equipped. A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 13A is a diagram illustrating an external view of an exemplary GR device and components thereof, in accordance with various exemplary embodiments of the disclosure.

FIG. 13B depicts a diagram illustrating a printed circuit board (PCB) of the exemplary GR device and components thereof, in accordance with various exemplary embodiments of the disclosure.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagrams relating what is known to novel aspects of the present disclosure.

Figure 1:
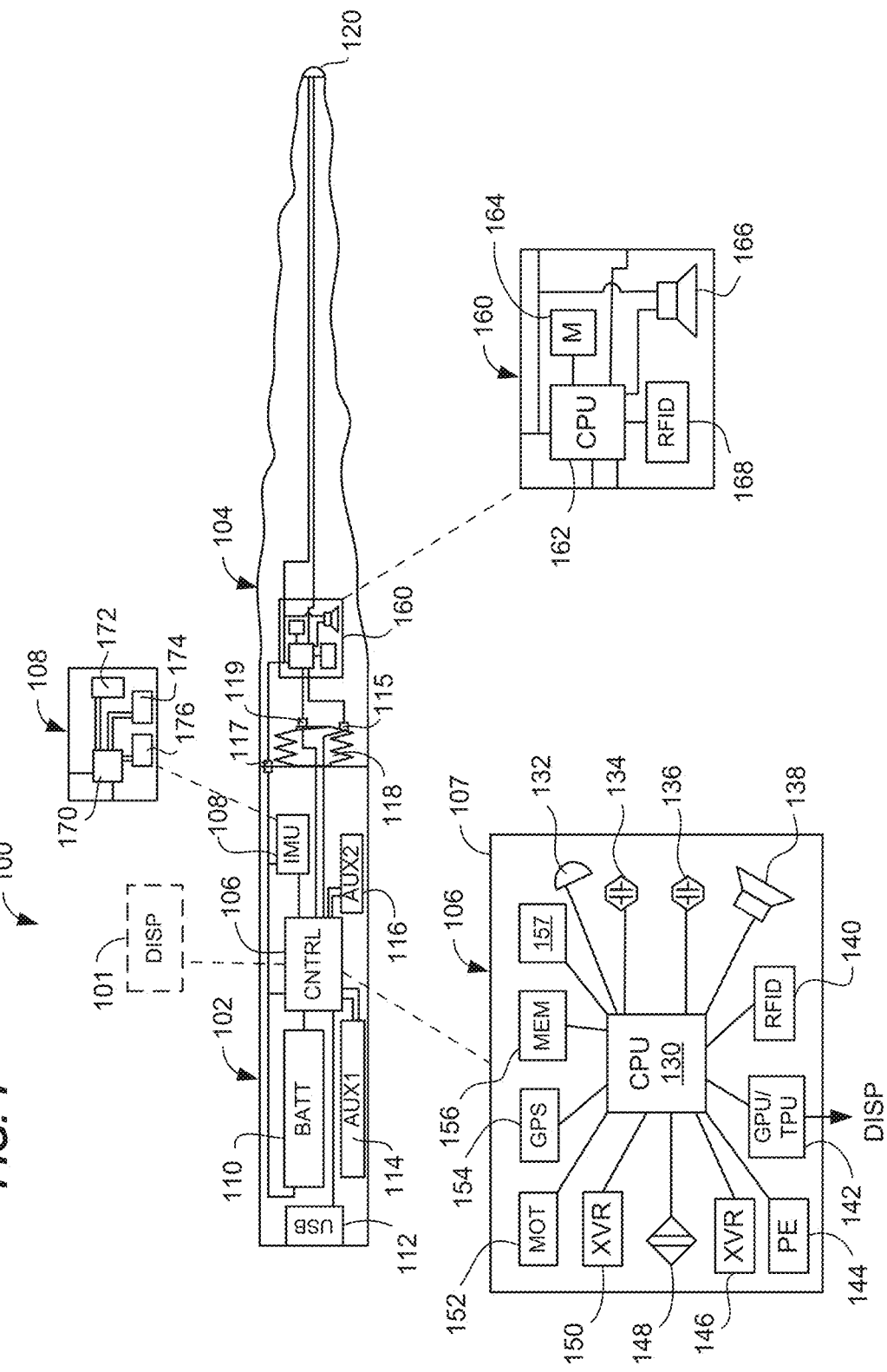
FIG. 1 is a diagram illustrating a GR device and components thereof.

Referring to FIG. 1, gesture-recognition (GR) device 100 may be used with one or more connected devices to provide enhanced experience at home, retail locations, theme parks, theaters and other locations. The GR device may include a controller 106 (e.g., a Raspberry Pi 0W) configured to perform operations of the GR device 100, including detecting different gestures formed by motion of the GR device and triggering corelated actions to be performed by connected devices, for example, devices 201-213 shown in FIG. 2, in response to each gesture. In accordance with various embodiments, the controller 106 may be interchangeably referred to as a microcontroller (MCU), without any deviation from the scope of the disclosure. The connected devices 201-213 to be individually described later may each perform an action determined based on a gesture performed by user 99 holding or wearing the GR device 100, to provide an enhanced personalized experience. The user moves the GR device through a pattern of motion, and with or without a verbal command, one of the connected devices performs a desired action. A good deal of hardware and software makes this appearance of magic possible.

Referring again to FIG. 1, an embodiment of the GR device 100 may include two principal components, a base unit 102 and an elongate unit 104. In some embodiments, the base unit 102 and the elongate unit 104 may be configured as a single piece. For a GR device 100 styled as a wand, the base unit 102 may be configured to be grasped by the user's hand, while the elongate unit 104 may be configured to have a form factor of a wand tip that extends outward from the base unit 102 and provides the wand's overall appearance. In some embodiments, the extendable unit 104 may be configured to be removably attached to the base unit 102. In some embodiments, the base unit 102 may be permanently fixed to the elongate unit 104. In some implementations, all the electronics may be placed in the base unit 102 while the elongate unit 104 can be devoid of any electronics. In some other implementations, a first portion of the electronics may be disposed in the base unit 102 and a second portion of the electronics may be disposed in the elongate unit 104. For example, heavier, more expensive electronic components may be placed in the base unit 102 while relatively inexpensive electronic components may be placed in the elongate unit 104. The elongate unit 104 may be provided with different appearances and capabilities to suit users' needs.

To provide interchangeability, a removable fastener 118 with electrical contacts 115, 117, 119 may be used to couple the base and elongate units 102, 104. While an internally-threaded coupling is shown, other couplings may also be suitable, for example, an externally threaded plug-and-socket, a threadless plug-and-socket with or without a locking feature, and so forth. Since the GR device is designed to be moved rapidly around, a locking feature is advantageous to prevent undesired decoupling.

Capabilities of the GR device 100 may be limited or enhanced depending on an identity of a user of the GR device 100 or the elongate unit 104. For example, the elongate unit 104 may include a radio-frequency identification device (RFID) 168 or other identification device, and a gesture recognition and control system of the GR device 100 may be configured to work differently depending on the identity of the elongate unit. For example, special commands may be "unlocked" for certain identifiers. In home settings, commands may be refused except from movements of GR devices that include identifiers registered for a household. As another example, special commands may be unlocked depending on the identity of a user. Information regarding the identity of a user may be communicated to the GR device 100 via one or more connected devices associated with the GR device 100.

While a wand is illustrated, it should be appreciated that a GR device 100 may have any suitable form factor for being held or worn by a user and carried by movements of a user's extremities. For example, a GR device 100 may be styled as a walking staff, a light stick, a ring, a body ornament, a glove, a bracelet, or any article capable of being held and moved through the air by a user. For further example, in a ring, bracelet, or similar jewelry, the base unit 102 may be contained in the body of the jewelry while the elongate unity 104 may be styled as a gem or ornament.

Ornamental features aside, operation of the GR device 100 depends on its internal circuitry and elements in its wireless network. The internal circuitry of the GR device 100 may include a controller 106 coupled to an inertial measurement unit (IMU) 108, to a power storage unit 110 (e.g., a battery), and to an input-output and power connector 112 (e.g., a Universal Serial Bus (USB) port). Optionally, the controller may be coupled to one or more auxiliary devices 114, 116, described in more detail herein below, and to electronics in the elongate unit 104, for example, one or more light-emitting devices (LEDs) 120 and accompanying controller 160, if any.

The IMU 108 (e.g., sensor BN0055 from Bosch) may include one or more accelerometers 172 for acceleration detection, one or more gyroscopes 174 for force and movement detection, and a magnetometer for geographic orientation. The GR device mat include one or more IMUs 108, which may be in the base unit 102, the elongate unit 104, or in both the primary and elongate units. The IMU may include a processor 170 that determines from sensor data magnitude and direction of motion in up to three spatial axes, three rotational axes, and three geospatial orientation axes, or other useful metric for determining pattern of movement and the associated gestures, using any desired coordinate system (e.g., Cartesian or spherical) and any useful sampling interval, such as for example, 0.1 to 100 milliseconds. The IMU 108 may output other useful information, for example, its geospatial orientation. When the wand 100 is moved in space to perform a gesture, data from the accelerometer, the gyroscope and/or the magnetometer of the IMU 108 is processed by the processor 130 to detect the pattern of movements, identify the gesture and associate it with an action to be performed by a connected device. As described in more details herein, the processor 130 may access local or remote data structures and servers to complete identification of the gesture and selection of an appropriate associated action. The processor 130 may execute the identified action (e.g., illuminating LED 120 with a specific color or emitting a predetermined sound from an audio transducer 138, 166), cause instructions to be sent to a connected device, or both.

The controller 106 may include a processor 130 coupled to a random access memory (RAM) 156 holding program instructions and data for rapid execution or processing by the processor during operation. When the apparatus 100 is powered off or in an inactive state, program instructions and data may be stored in a long-term memory, for example, a non-volatile magnetic, optical, or electronic memory storage device 157. Either or both of the RAM 156 or the storage device 157 may comprise a non-transitory computer-readable medium holding program instructions, that when executed by the processor 130 cause the GR device 100 to perform operations as described herein for gesture recognition and control, alone, or in combination with one or more additional processors. The one or more additional processors may be coupled locally to the processor 130, remotely via a wireless connection, or both. Program instructions may be written in any suitable high-level language, for example, C, C++, C#, JavaScript or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

To assist with personalization and operation of the GR device 100, the controller 106 may be attached to various other input and output devices, arranged with it on a module circuit board 107 and/or elsewhere in the GR device 100, for example arranged onto a single circuit board within the GR device 100. For example, the controller 106 may be attached to a microphone 132 to receive voice commands, and an audio transducer (e.g., a speaker or piezoelectric device) for audio output. The controller 106 may include a graphics or text processing unit 142 providing a signal for controlling output of an electronic text or graphic display 101. The display 101 may be integrated with the base unit 102 or may be provided in an auxiliary device (e.g., a smartphone) that couples to the processor 130 via one or more wireless transceivers 146, 150. The transceivers 146, 150 may support one or more protocols, for example 5G, Bluetooth, NFC or WiFi. The display 101 may display text, picture or video animations based on a gesture input. The processor 130 and memory 156 may be configured with one or more modules for speech to text conversion, gesture to speech conversion, or gesture to text conversion. In an alternative, the display 101 may be used as a user interface for configuring the GR device. The controller may include a motion controller 152 for driving an electric motor of a rotational, vibrational, or pulsating feature installed near an externally-facing surface, e.g., at block 116 in base unit 102. The controller 106 may include an ambient light sensor 134 to detect ambient light levels, a skin conductance sensor 136 for biometric sensing, a proximity detector 148 to detect when the device is in proximity of other connected devices, an RFID sensor 140 for reading identifiers from an RFID device 168 of the elongate unit 104 or other device, a particle (e.g. smoke or vapor) emitter for special effects, and a geolocating device (GPS) receiver 154.

It may be advantageous to locate certain sensors or output devices at, on or near an external surface of the GR device 100, for example at block 114 (Auxiliary 1). Suitable devices located may include, for example, a biometric sensor such as an electrode array to detect heart rate of the user, a thermistor to detect skin temperature, the skin conductance sensor 136, the particle emitter 144, a scent detector or emitter, a fingerprint reader for user authentication, and/or a heating element to enable the device to heat or cool based on gesture input.

In various embodiments, an ancillary controller 160 may be used to augment capabilities of the primary controller. As illustrated, the ancillary controller includes a processor 162 and memory 164 holding program instructions for controlling one or more LEDs 120 and an ancillary audio transducer 166. The controller may include an ID device 168 for positively identifying the model and serial number of the elongate unit 104, in support of interchangeable variety in program functions and system security. The controller 160 may include any one or more devices and sensors described in connection with 106, for example, a second IMU. Separated IMUs in the base and elongate units 102, 104 may be useful for more sophisticated gesture recognition, especially for flexible GR devices. For example, a glove configured as a GR device with multiple IMUs to capture motion of each separately movable part of a hand may be used to detect the full complexity of human language (e.g., American Sign Language). In embodiments, the 162 and memory 164 may be omitted, and local processing may be implemented only in the base unit 102, e.g., processor 130.

Figure 2:
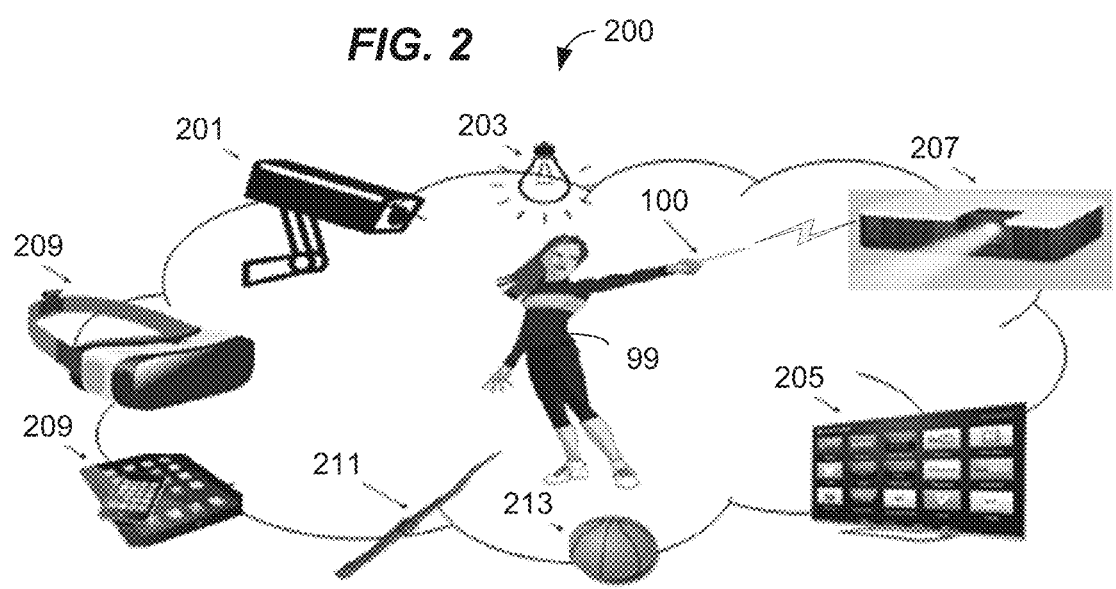
FIG. 2 is a diagram illustrating use cases for a GR device in a connected environment.

Before describing more technical features of the GR device and related systems and methods, applications for gesture recognition by a GR device will be described, in context of a connected environment 200 as shown in FIG. 2.

In an aspect, a GR device 100 may be configured as an Internet of Things (IoT) device, for example, a camera 101 or a light control module 203 may be controlled by the GR device 100. The GR device 100 may be configured to activate other connected devices based on gestures and/or voice commands of a user 99. For example, gestures can be used control lights, fans, air conditioners, toasters, refrigerators, doors, garage doors, cars, vacuum cleaners and other home appliances. In some implementations, the CR device can directly interact with another IoT device. However, in other implementations, the GR device may be configured to interact with other IoT devices through an intermediary system such as, for example, Google Home, Alexa, or other IoT hub.

In another application, a GR device may be configured to interact with a variety of toys 211, 213 (e.g., balls, cars, vehicles, dolls, robots, etc.) For example, gestures by the user 99 holding the GR device 100 may be used to control movement of a vehicle, a ball, or a figure (e.g., doll or robot). The toys may be configured as IoT devices, or as wireless devices configured for direct connection to the GR device or an indirect connection through an auxiliary device (s).

In other applications, a GR device 100 may be used to provide a variety of augmented reality (AR) or virtual reality (VR) experiences 209. Gestures may be used to control virtual objects in a VR environment, for example, by communicating gestures detected by the GR device 100 to a VR device worn by the user to control one or more virtual objects. Gestures may also be used to control virtual objects in an AR environment. In this scenario, one or more virtual objects can be overlaid over objects in the real world (e.g., a virtual ball/feather is placed on a table in the real world). The gestures detected by the GR device 100 may be communicated to the AR device 209 worn by the user to control one or more virtual objects.

A GR device may be used to enhance entertainment presented over a television 205, notepad computer 209, projector 207, or other content delivery device. For example, gestures made with the GR device may be used to interact with real and/or virtual objects or projected images to unlock additional content and/or bonus features (e.g., additional scenes, making of the scene, etc.) in an entertainment setting (e.g., at a theater/a theme park/cruise ship/some other entertainment setting). Gestures with the GR device may be used to enhance the experience of watching a movie or playing a game. For example, gestures can be used to add content to a scene when watching a movie or a game. As another example, gestures can be used to control the narrative of a movie. The device can light-up, vibrate and/or buzz at climactic movements while watching a movie or a show.

In the area of retail sales, a GR device 100 may be configured to identify an item selected by the customer using gesture control. If the item is wearable (e.g., clothing, footwear, headwear, accessory, or the like) a retail experience system in communication with the GR device 100 may be further configured to display or project an image of the customer wearing the selected item in the customer's size based, on a gesture made by the GR device 100. The image can be displayed on a display device (e.g., a smart phone, a smart mirror, a computer, a smart pad, etc.) or projected in the ambient environment. The customer can use gesture control to change the size and/or color of the selected item of clothing/shoe. The customer can perform another gesture to buy the selected item of clothing/shoe. The selected item of clothing/shoe can be delivered to a preferred location of the customer.

For social applications, a GR device 100 may be personalized to the user. For example, a GR device 100 may be configured to recognize the user's biometric/voice and retrieve personal information associated with user (e.g., name, birthday, affiliations, preferences, and so forth). As another example, a GR device 100 can provide a unique user identifier to a user recognition system which can further retrieve personal information associated with user (e.g., name, birthday, affiliations, preferences, and so forth). The retrieved personal information can be used to recognize the user at theme parks, retail locations, theaters, or other venues; keep track of rewards, offer redemption of rewards, provide personalized service, customize offers, or other communication actions. Personal information retrieved with permission via a user's GR device can be used to greet the user upon entry into a space, alter the colors or other decorations of the space to reflect the user's affiliations/preferences. The retrieved personal information can also include a list of the user's friends or other people associated with one or more social groups that the user belongs to. The GR device may be configured to receive information of the user's friends or other people associated with one or more social groups that the user belongs to in the user's vicinity and alert the user to their presence to facilitate social interaction. Further to enhance social communication, a GR device may be equipped with gesture to speech conversion or gesture to text conversion capabilities. Accordingly, a GR device may facilitate communication between individuals who don't speak the same language. These capabilities can also be beneficial to individuals with disabilities. As a geospatial locating device, a GR device may be used as, or as part of, a navigation instrument capable of providing turn by turn directions from origin to destination to a user.

A GR device may be used to enhance a consumer experience at a retail location and encourage sales. In an illustrative application, a user is notified via an application (e.g., a magic/fantasy app) on a personal smart device (e.g., an Android device, iPhone, etc.) that he/she is now eligible to purchase an item (e.g., a special robe, a special toy, an accessory, etc.) from a retail location. The user's arrival at the retail location may be communicated by the application on the user's personal smart device to a user arrival notification system located in the vicinity of entrance of the retail location. Thus, when the user arrives at the retail location, a retail greeting system or the application may welcome the user with a personalized greeting. The personalized greeting may include, for example, the user's name, the name of the item they wish to purchase, the area of the retail location where the item is stored, and other pertinent information.

Figure 3:
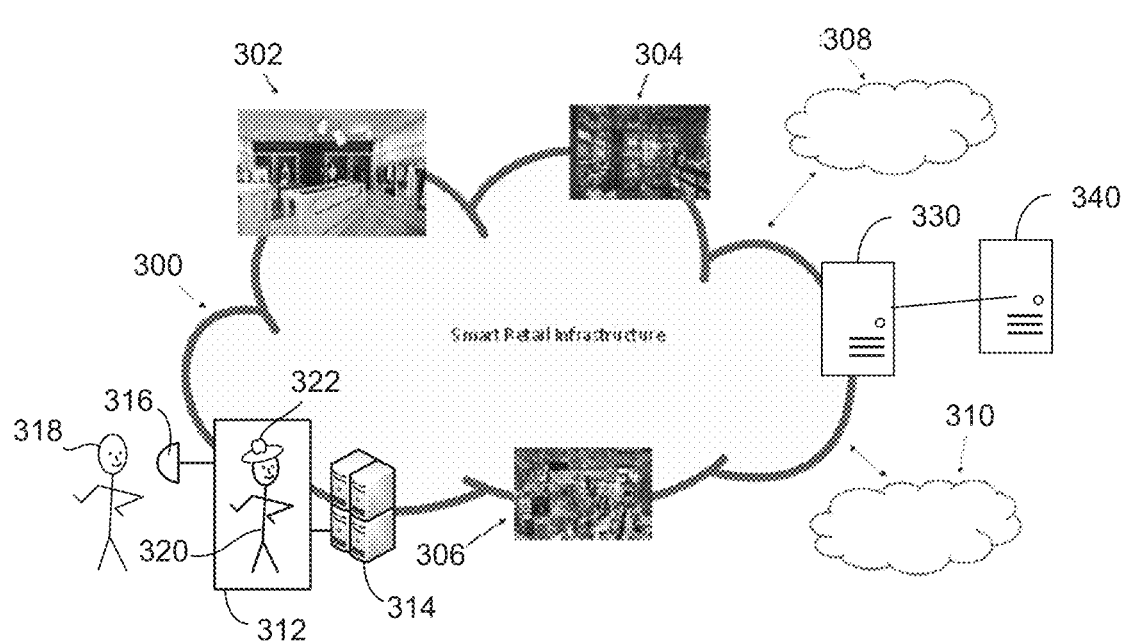
FIG. 3 is a diagram illustrating a smart retail environment embodying an aspect of a system for providing a personalized experience.

The user arrival notification system may be a part of a smart retail infrastructure 300, illustrated in FIG. 3. The user arrival notification system can include a communication system configured to receive information from the application on the user's personal smart device. An implementation of a smart retail infrastructure is described below. In some implementations, the smart retail infrastructure may receive some or all the relevant user information from the application on the user's personal smart device at the time of receiving the user's arrival information. For example, the smart retail infrastructure may receive some or all the relevant user information from one or more databases (e.g., databases located in the cloud). The relevant user information may be retrieved from the cloud based on information received from the application on the user's personal smart device.

At the retail location, the user may be provided with a generic wand (e.g. GR device 100) if the user doesn't already have a personal wand of their own. The wand can be configured to guide the user to the location where the item to purchase is located. For example, the wand may vibrate or illuminate when the user points the wand in the direction of the location of the item to purchase. The wand may be used in conjunction with a map of the retail location that is displayed by the application on the user's personal smart device. The wand may be configured to provide turn by turn directions to the user in the retail location to guide the user to the location of the item to purchase. The wand may be configured to buzz, vibrate, become hot/cold, light-up and/or point to guide the user to the location of the item to purchase.

Upon reaching the location of the item to purchase, the smart retail infrastructure may prompt the user try on the item for size when the item to purchase is an article of clothing, footwear, headgear, eyewear, jewelry or some other wearable accessory. The smart retail infrastructure may prompt the user via the user's personal smart device, via speakers deployed in the retail location and/or via speaker of the wand. In some implementations, the user may try on the item virtually.

In an aspect, the smart retail system may include a smart mirror 312, comprising a computer display coupled to a camera 316, and a video server 314. The smart mirror at the retail location may display an image 320 of the user 318 wearing the article of clothing, footwear, headgear, eyewear, jewelry or some other accessory 322 (headgear only shown). In another aspect, the smart mirror can be configured to detect and note the user's emotional response to the appearance in the smart mirror, for example the user's facial expression indicating satisfaction or displeasure. In some implementations, the smart mirror and/or the application on the user's personal smart device may offer size or color recommendations to the user. The size or color recommendations may be made based on the user's preference, the detected emotional response with the item being tried on and other considerations. A display or audio output of the smart mirror 312 or the application on the user's personal smart device may request the user to confirm the color and/or size of the item and perform a predetermined purchasing gesture if the user wants to purchase the item. The purchasing gesture may be detected by the GR wand and transmitted to the smart retail infrastructure directly or via the user's personal smart device. Upon receiving notification of the purchase, the smart retail infrastructure may be configured to trigger congratulatory messages (e.g., triggering a light show in the vicinity of the user, causing the wand to light up/buzz/vibrate, issue verbal confirmation of the purchase, etc.) to confirm the purchase. The user may be notified (e.g., via the smart personal device) that the item will be delivered to a preferred delivery location.

The application on the user's personal smart device may be configured to notify the user regarding the presence of friends and/or other members in the user's social groups in the retail location. The application on the user's personal smart device may display the location of the user's friends and/or other members in the user's social groups on a map. The wand in conjunction with the application on the user's personal smart device may guide the user to the location of the user's friends and/or other members in the user's social groups. The map of the retail location may reveal hidden places within the store location which are accessible to the user and his friends. Special items and/or discounts may be available to the user and his friends when the access the hidden places through the map.

The retail location may include other activities to facilitate social interaction, such as, for example, photobooth, food stalls, etc. Further details of a smart retail infrastructure 300 may include a plurality of retail locations 302, 304, and 306 connected to the smart retail infrastructure 300. Each retail location 302, 304, and 306 may be associated with a unique store identifier. Each retail location may include a plurality of connected devices, such as, for example, communication devices at the entrance and various other locations in the retail location, lights, projectors, televisions, speakers, microphones, or other connected devices. The plurality of connected devices in each retail location are a part of the smart retail infrastructure 300. The smart retail infrastructure can interface with other cloud infrastructures 308 and 310.

The smart retail infrastructure 300 may include information regarding the capabilities of the various connected devices in each retail location. Accordingly, the smart retail infrastructure can customize the user experience in each retail location based on the capabilities of the various connected devices in each retail location.

For example, if a retail location 306 does not have a smart mirror, then the smart retail infrastructure may prompt the user to use his/her personal smart device to virtually try on the item to purchase. As another example, if the lights in the retail location 304 are not capable of changing colors, then the smart retail infrastructure may not use the light effects in creating user's retail experience.

In some implementations, each retail location may be provided with edge computing device or server 330. In such implementations, the capabilities of the various connected devices in the retail location may be stored at the edge of the smart retail infrastructure within the edge computing device 330. A central processor 340 of the smart retail infrastructure may create a user experience that is common to all the retail location assuming full capabilities of the various connected devices. Individual edge computing devices may tailor the user experience for the individual retail location based on the capabilities of the connected devices.

Figure 4:
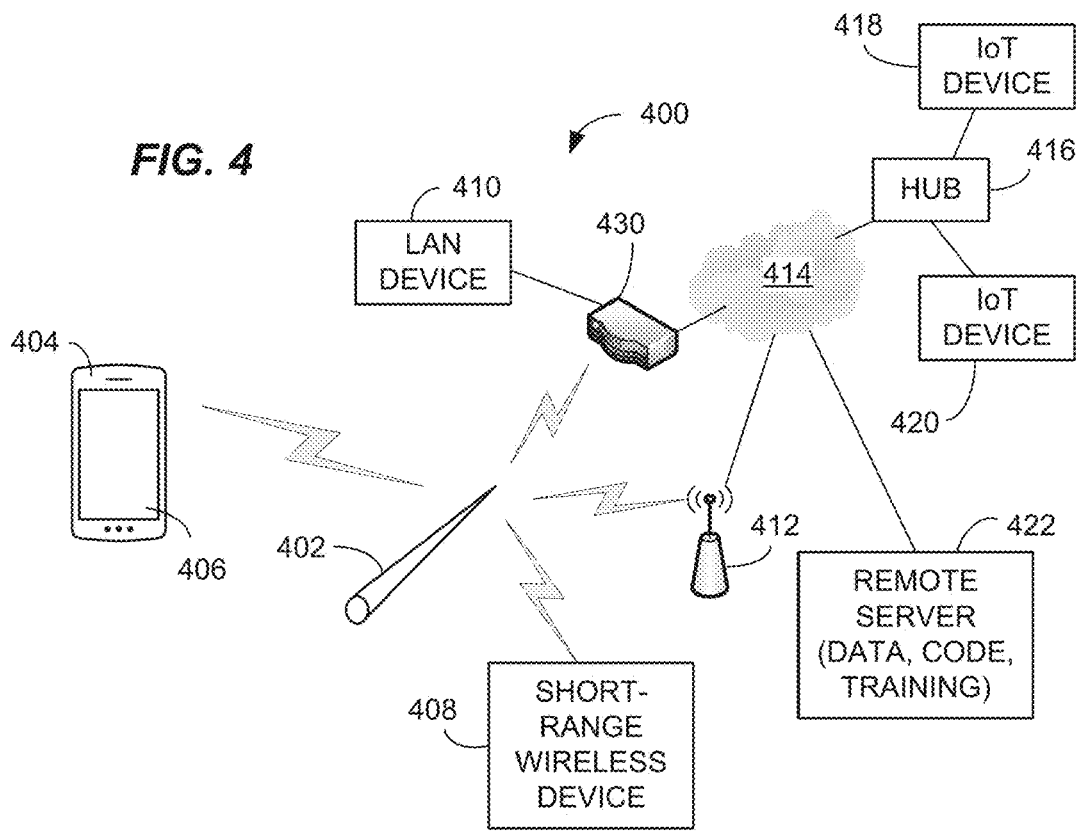
FIG. 4 is a system diagram illustrating hardware components of a system for providing a personalized experience, including a GR device.

FIG. 4 shows additional components and aspects of a gesture recognition system 400 for use with applications described herein, for interacting with a GR device 402, which may be the same as or similar to the GR device 100 previously described. The system may include a smartphone 404 with touch screen display 405 in wireless communication with the GR device 402. The GR device 402 may communicate with local connected devices, e.g., LAN client device 410, via a router 430. The GR device may communicate with a short-range wireless (e.g., Bluetooth) client device 408 via a peer-to-peer wireless link. The GR device 402 may communicate with wide area network (WAN) IoT clients 418, 420 via a hub server 416 (or without the hub, as applicable), WAN 414 and router 430 or wireless access point 412. Likewise, the GR device 402 may connect with one or more remote servers 422, that may provide resources for gesture recognition, for example, library data, or code execution for gesture recognition or gesture recognition training. For example, a remote server 422 may classify gestures by type and associate the action identifiers and gesture types, while characterizing a movement pattern as digital data is done by a processor of the GR device. In various implementations, the GR device may initiate the first step in a gesture recognition process—converting a gesture into a wireless, machine-readable signal that can be characterized by type—without performing later operations in a chain of causation between a gesture by the user and an action by a target device. In other embodiments, the GR device may perform later operations in the chain of causation.

Figure 5:
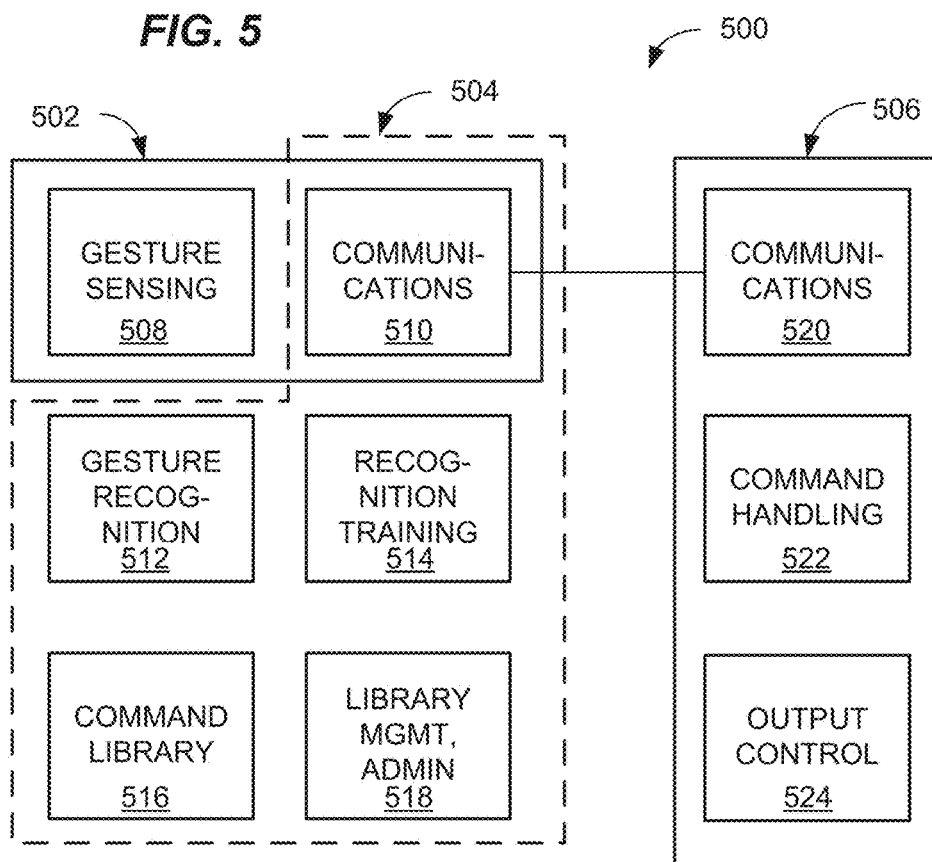
FIG. 5 is a block diagram illustrating programmable components of a system for providing a personalized experience, including a GR device.

FIG. 5 shows programmable components of a GR system 500 for providing a personalized experience, including a GR device. Block 502 encompasses critical components of a GR device for local execution. Dashed block 504 encompasses components that may be executed by a remote server, by the GR device, or both. Block 506 encompasses components of a connected device that performs an action determine by the GR system 500, for example connected clients as described in connection with FIG. 2. Gesture sensing 508 is performed locally by sensors and at least one signal processor of the GR device, as the user moves the GR device in space. As used herein, gesture sensing can refer to the detection of pattern of movements. The GR device and remote server, if any, may include a communication module 510 for communicating data and instructions with each other and with the connected client 506 via its communication module 520, which may be, or may include, for example, a standard IoT interface. The GR device 502 and/or remote server 504 may include a gesture recognition module 512 that classifies certain patterns of movement into specific categories, also called types or gestures. The GR device 502 and/or remote server 504 may further include a command library or data structure module 516 that associates gestures with action identifiers (e.g., commands).

The GR device 502 and/or remote server 504 may further include a training module 514 for configuring new patterns of movement as gestures to be recognized by the system 500. Thus, a user may configure their own gestures and expand their gesture libraries. The GR device 502 and/or remote server 504 may further include an administration and management module 518 for adding, deleting, and editing entries in their command library. Thus, a user or administrator may manage and alter library content for changing circumstances and needs.

A client device 506, also called a target or target device, need only be capable of receiving a command via a communications module 520, processing the command signal by an information processing (including command handling) module 522, and controlling its output accordingly via an output control module 524. Communications protocols used by the client 506 may be standard protocols, e.g. IoT, Bluetooth, so connection with any device capable of connecting via a common protocol is possible.

Figure 6:
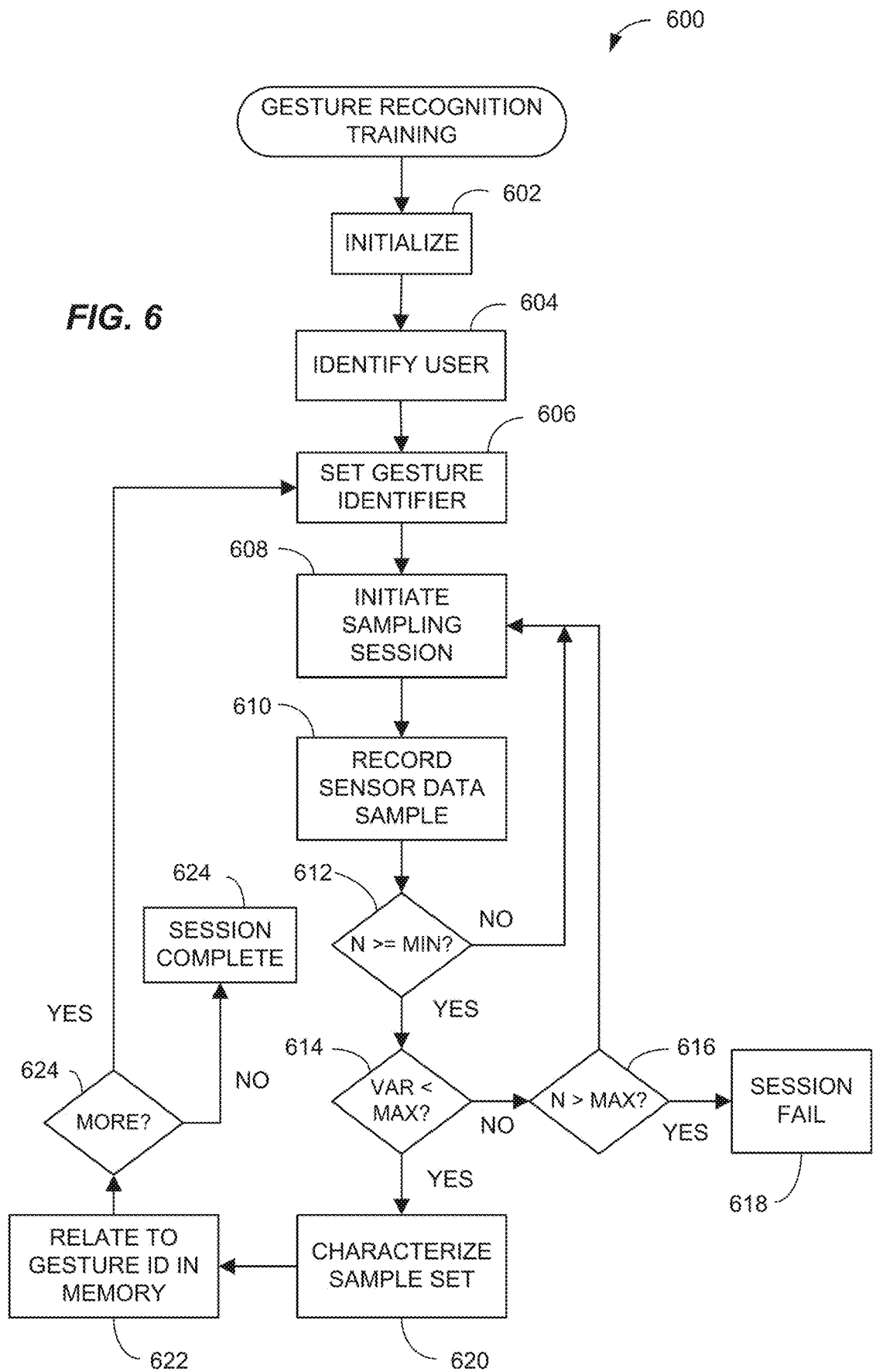
FIG. 6 is a flow chart illustrating aspects of gesture recognition training for use in or with a GR device.

Before a GR system (e.g., system 500) can recognize a pattern of movements, it may need to be programmed or trained to do so. Rules-based algorithms for pattern recognition may be programmed manually or semi-automatically, while heuristic algorithms (e.g., neural networks) may be trained using training sets. In both cases, an envelope for each gesture is defined. Gestures that fall within the envelope are classified (recognized) while those that fall outside the envelope are not classified (unrecognized). FIG. 6 shows aspects of gesture recognition training method 600 for use in or with a GR device and/or system 100, 402, 500. Gestures may be personalized for each user or user cohort, standardized for all users, or defined by both standard and personalized factors.

At 602, a processor initializes a training session, for example, in response to user or system input requesting training for a new or existing gesture. At 604, the processor may identify the user of the GR device, which may determine which gesture library the gesture belongs to. At 608, the processor may initiate a sampling session, for example, immediately after causing the GR device to emit an audible tone indicating training is to begin. At 610, the processor records motion sensor data for an interval of time, or until motion ceases, depending on the type of gesture. At 612, the processor determines whether a number of recorded samples 'N' is greater or equal to a minimum number of samples. If N is less than a minimum needed to characterize a gesture envelope, the processor reverts to record another sample at 608. If N is not less than a minimum, then the processor at 614 determines whether variance between recorded samples is less than a threshold of maximum acceptable variability. If variability is too high and the number of samples recorded exceeds a maximum number at 616, the training session fails at 618. If variability is too high and the number of samples recorded does not exceed the maximum, then the processor reverts to record another sample at 608.

If variability is within acceptable limits at 614, then the processor characterizes the sample set for the gesture at 620. For a rules-based recognition algorithm, a sample may be characterized using statistical tools, for example, mean and standard deviation, in comparing motion values across comparable intervals of time. For heuristic algorithms, a neural network or other heuristic process receives feedback from the user regarding acceptable and unacceptable sample gestures until it can accurately predict whether a motion pattern qualifies as a gesture.

At 622, the processor relates the data characterizing the gesture envelope (e.g., statistical ranges or parameters of a heuristic machine) to the identifier determined at 606 in computer memory, for example, in a library database. At 624, if the user wishes to train the system for another gesture, the processor reverts to block 606 for a new identifier. Otherwise, the processor completes the session at 624, for example by signaling the user and/or other devices in the system that the training session is complete.

Figure 7:
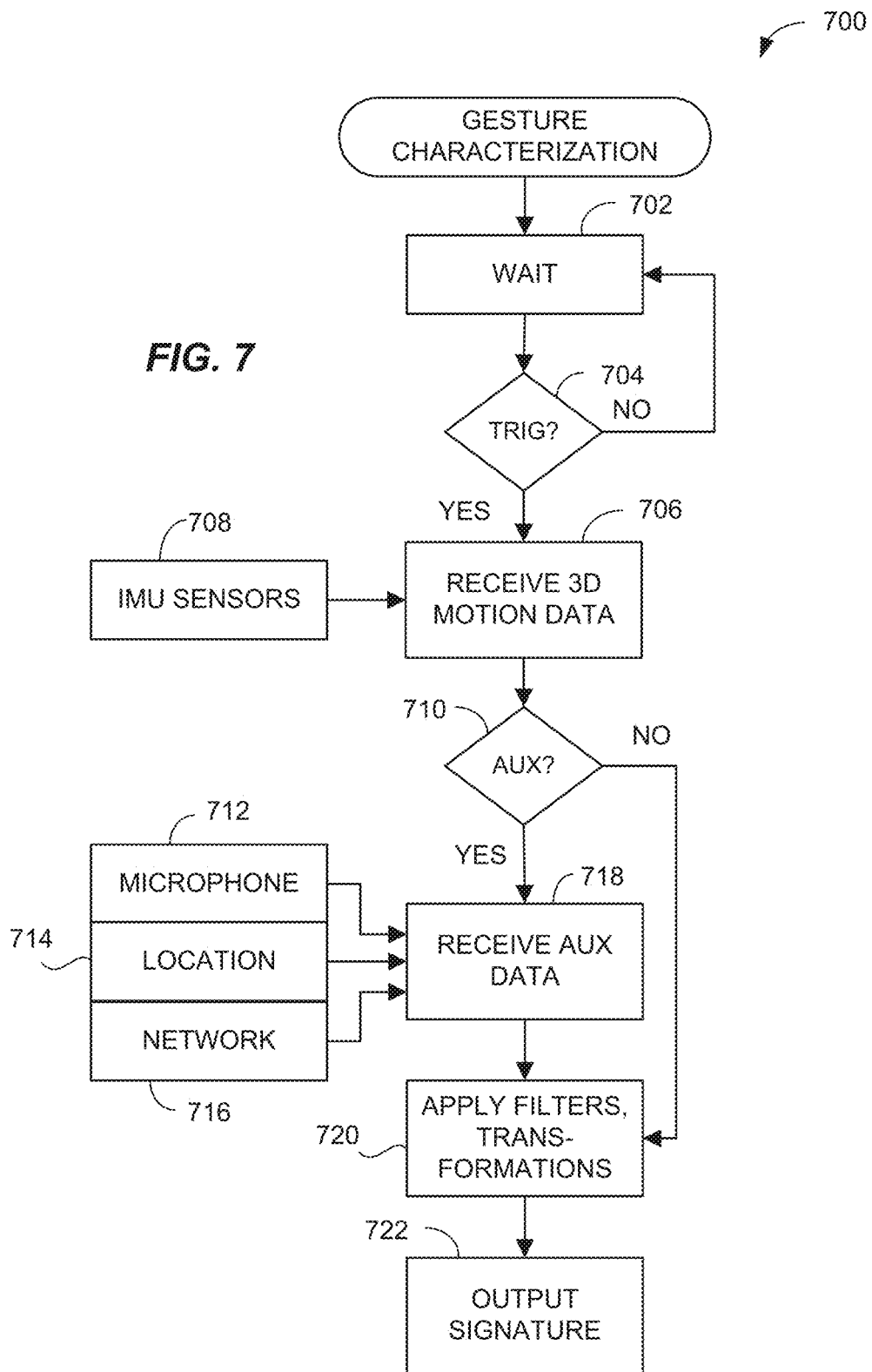
FIG. 7 is a flow chart illustrating aspects of characterizing a data signature for use in or with a GR device.

FIG. 7 shows aspects of a method 700 for characterizing a data signature for use in or with a GR device. The method may be used whenever desired to receive and recognize gesture input for applications as described herein. At 702, the processor waits for gesture input to begin. To avoid wasting processor resources, a user may deactivate the GR device's sensing capability when not needed, to prevent continual processing of random movement data. Thus, a trigger for gesture sensing may include a manual activation of the sensing function coupled with movement of the GR device. Manual activation may include, for example, receiving a spoken command, e.g., "abracadabra!" from the user. At 704, the processor waits until a trigger is received. Once the trigger is received, at 705 the processor receives 3D motion data from one or more IMU sensors. The data may include 3 spatial, 3 rotational, and 3 geospatial orientation axes as previously described, or some lesser subset of these 9 axes.

At 710, the processor determines whether any auxiliary data (e.g., a verbal command, or other input) is to be included as input to defining the gesture signature. This may be determined, for example, based on user preferences or other definition of data making up gesture input. Auxiliary data from a local microphone 712 may be used to supply a verbal component, such as a word or sound that included as part of the gesture. A location sensor 714 or example a GPS sensor, may be used to provide location data to constrain operation of the gesture to the present location. A network sensor 716 may similarly be used to provide network address data to constrain operation of the gesture to definite nodes of a network. Gesture definition is not limited by these examples. At 718, the processor receives the auxiliary data contemporaneously with receiving the motion data 706, or a short interval before or afterwards. At 720, the processor applies filers and transformations (e.g., Fourier transforms) to efficiently encode the gesture data for later recognition. An encoded gesture may be referred to herein as a "signature" or "gesture signature." At 722, the processor outputs the signature for downstream processing.

Figure 8A:
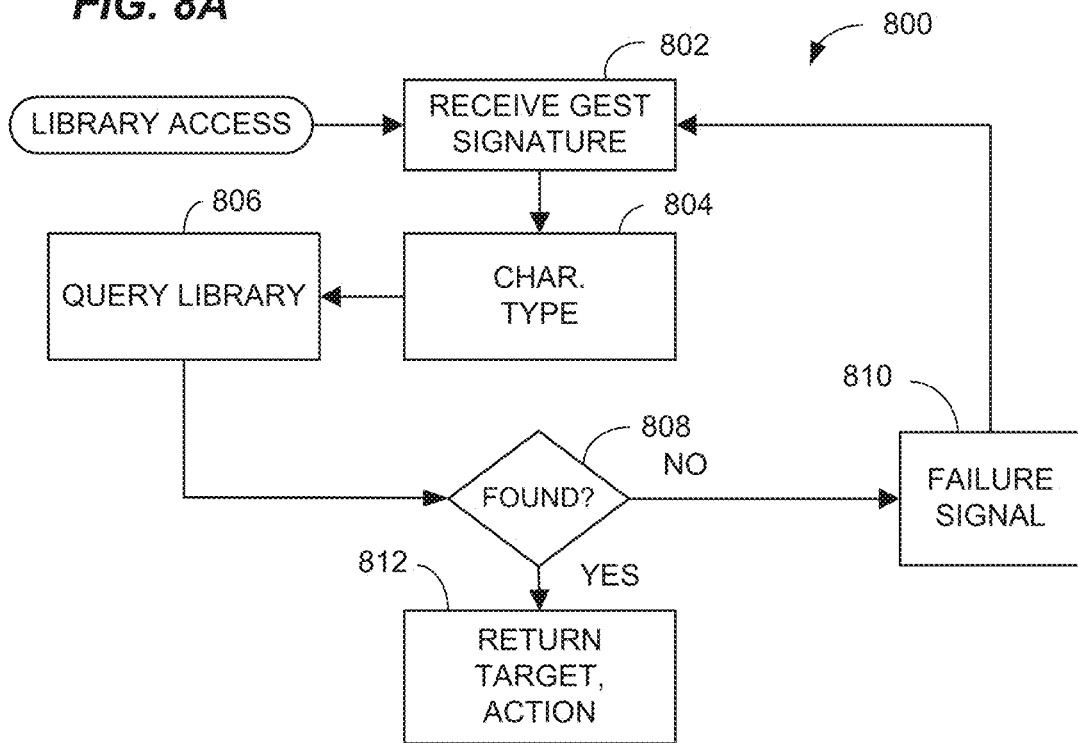
FIG. 8A-B are flow charts illustrating aspects of accessing a library of gesture-action associations and recognizing a gesture type.
Figure 8B:
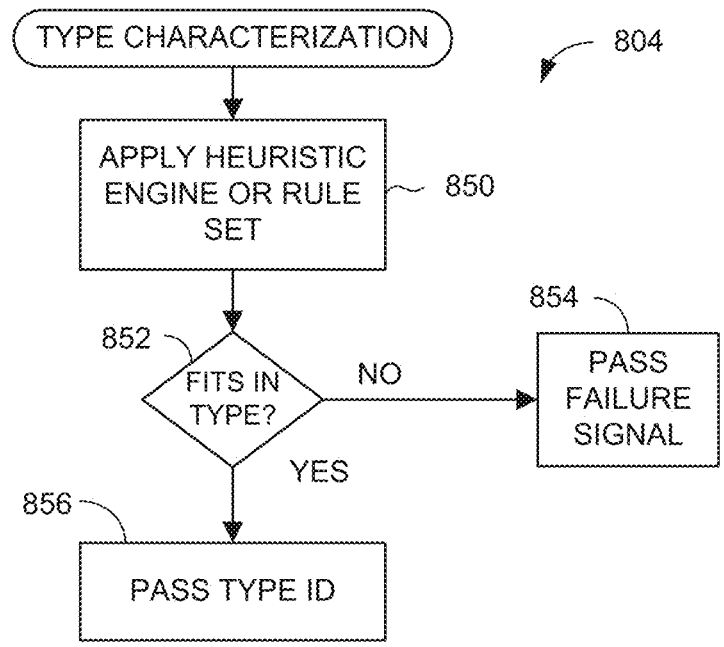

FIG. 8A-B show aspects of a method 800 for accessing a library of gesture-action associations and a related method 804 for recognizing a gesture type. At 802, a processor of a GR device or system receives a gesture signature. At 804, the processor classifies the character as a type, or as unclassifiable. At 806, the processor queries the user's gesture library by gesture type. If the gesture type is in the library at 808, the processor returns at 812 an identifier for a target client or clients and an identifier for at least one action associated with the gesture type, for use in controlling the targeted client or clients. If the gesture type does not exist in the library, or if the gesture is not classified, then the processor may provide a failure signal at 812.

FIG. 8B shows further details of gesture classification 804. At 850, the processor applies one or both of a heuristic or rules-based classification engine to the gesture signature. If using a heuristic algorithm, the processor may retrieve parameters for a heuristic engine trained on the user's gestures, populate the engine with the parameters, and process the signature using the populated engine. For a rules-based algorithm, the processor may select a class with the best fit across multiple measures of the movement (e.g., velocity, direction, acceleration, rotation, location) for each interval of time, and determine, for the best-fitting class, whether the fit satisfies a minimum threshold of similarity.

At 852, if the signature fits within a type, the processor may pass the type identifier; otherwise, it may pass a failure signal at 854.

Figure 9:
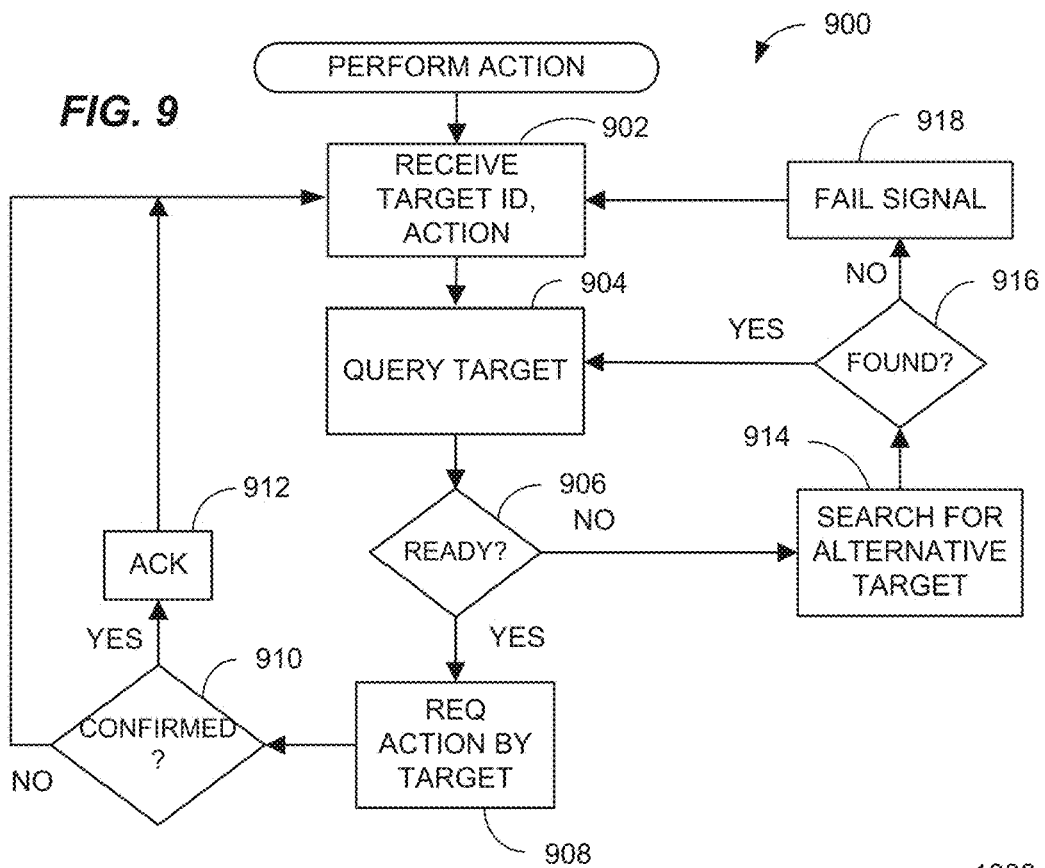
FIG. 9 is a flow chart illustrating aspects of performing an action specified by a gesture.

FIG. 9 shows aspects of a method 900 for performing an action specified by a gesture. At 902, the processor of a GR device or system may receive a target identifier and an action identifier. At 904, the processor queries the identified target using the action identifier, according to a query protocol for the target. At 906, the processor determines, based on a query response, whether the target is ready to perform the identified action. If the target is not ready, the processor may determine if an alternative or additional target is available at 914. If an additional or alternative target is available, the processor may revert to block 904, query target. If no other target is available, the processor may provide a fail signal at 918 and revert to 902 for the next requested action. If the target is ready at 906, the processor may request that the target perform the action at 908. At 910, the processor confirms that the action is performed, for example by receiving a signal from the target, or sensing a change in the environment caused by the action. If the performance is confirmed at 910, the GR device or system may provide an acknowledgement signal to the user, target, and/or administrative component of the GR system, and revert to block 902 for the next action. If the performance is not confirmed, the processor may revert directly to block 902.

Figure 10:
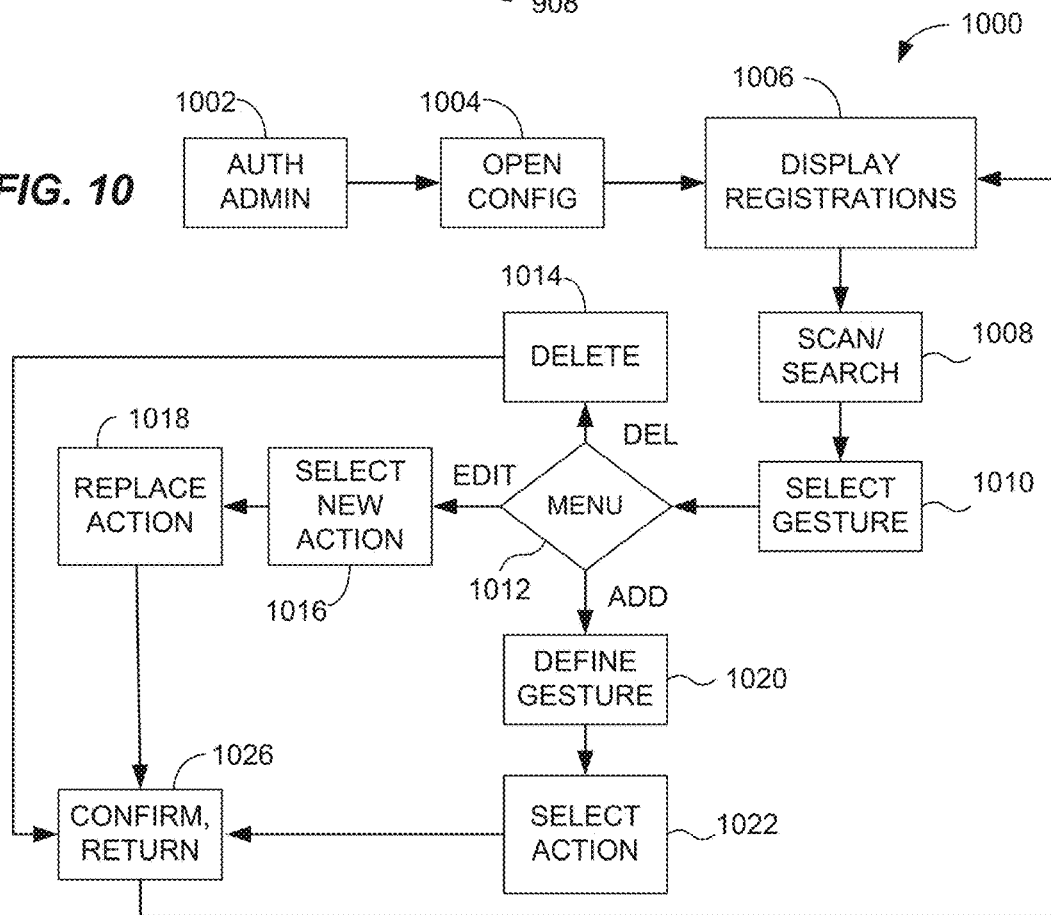
FIG. 10 is a flow chart illustrating a process for building or adding a personalized gesture library for use in or with a GR device.

FIG. 10 shows a process 1000 for building or adding a personalized gesture library for use in or with a GR device, such as may be performed by a administrative component of a GR system. At 1002, a processor of a GR device or system may authorize a user to edit a specified library of associations between action identifiers and gesture identifiers. At 1004, if the user passes authentication, the processor may access a configuration file specifying associations for the library. At 1006, the processor may output a display of current registrations, such as a list of gesture identifiers and associated action identifiers, using human-readable descriptions. At 1008, the processor may scan or search the configuration file to find a record requested by the user. At 1010, the processor may display a gesture returned by the search. In an alternative, the processor may omit the search 1008 and display 1010 if the user does not specify any gesture.

At 1012, the processor may present the user with a menu, including at least three possibilities: delete selected gesture, edit selected gesture, or add new gesture. If the user selects "delete," the processor may delete the gesture record at 1014, and at 1026, confirm the deletion and return to 1006 until user editing is finished.

If the user selects "edit," the processor may enable user selection of a new action and/or target, at 1016. For example, the processor may present an interface enabling user selection of a target from targets available to the user, and an action from available actions for each target. At 1018 in response to a user selection, the processor may replace the prior action and/or target in the configuration record with the newly selected action and/or target. Then the processor may confirm the change at 1026 and revert to the registration display until the user editing is finished.

If the user selects "add new action" at 1012, the processor may define a new gesture at 1020, for example, using the method 600 described in connection with FIG. 6. At 1022, the processor may enable user selection of any available action and/or target, for example as described in connection with block 1016. At 1026, the processor may confirm the change at 1026 and revert to 1006.

In accordance with an embodiment, as described above, the user may create corresponding gestures, which should not be construed to be limiting the scope of the disclosure. Notwithstanding, the disclosure may not be so limited, and in accordance with another embodiment, the gestures may be pre-programmed and stored within a gesture recognition system, that may execute within and/or in the background of an application of an external electronic device (such as a mobile device).

Figure 11:
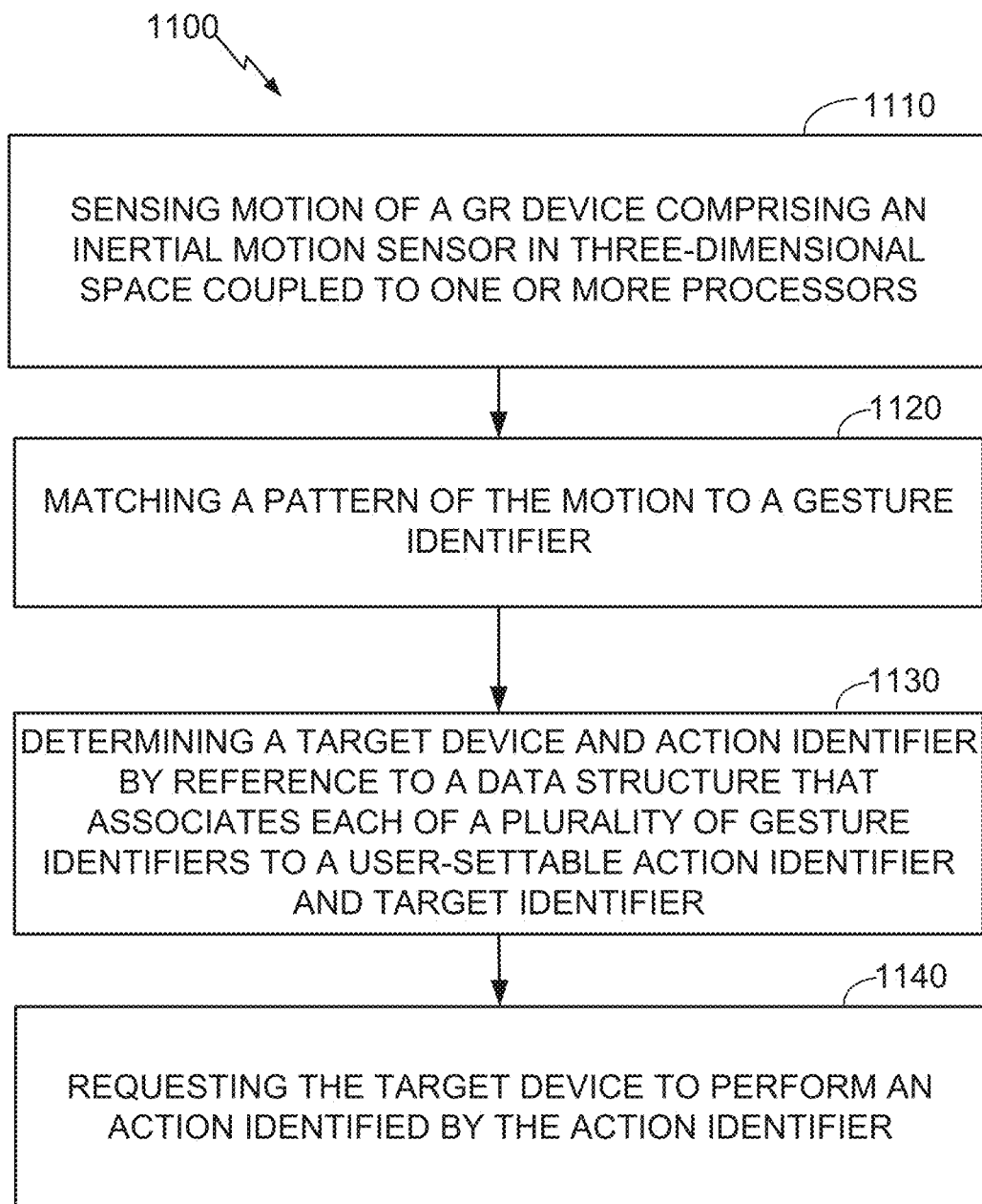
FIG. 11 is a flow chart illustrating a method for controlling a GR device to provide a gesture-centric user interface for controlling one or more connected devices.

FIG. 11 shows a method 1100 for controlling a GR device to provide a gesture-centric user interface for controlling one or more connected devices.

In accordance with the foregoing, and by way of additional example, FIG. 11 shows more general aspects of a method or methods 1100 according to one embodiment, as may be performed by one or more processors of a GR device or system as described herein. It should be appreciated that the more general operations of method 1100 may include or embody more detailed aspects of corresponding methods described herein above.

Referring to FIG. 11, a computer-implemented method 1100 for providing a gesture-centric user interface for multiple target devices may include, at 1110, sensing motion of a GR device comprising an inertial motion sensor in three-dimensional space coupled to one or more processors.

The method 1100 may further include, at 1120, matching a pattern of the motion to a gesture identifier. The method 1100 may further include, at 1130, determining a target device and action identifier by reference to a data structure that associates each of a plurality of gesture identifiers to a user-settable action identifier and target identifier. The method 1100 may further include, at 1140, requesting the target device to perform an action identified by the action identifier The method 1100 may include any one or more additional operations as described herein above. Each of these additional operations is not necessarily performed in every embodiment of the method, and the presence of any one of the operations does not necessarily require that any other of these additional operations also be performed. For example, optionally, method 1100 may further include a method 1000 of editing a library of gesture/action associations, or a method 600 for training a processor to recognize a gesture.

Figure 12:
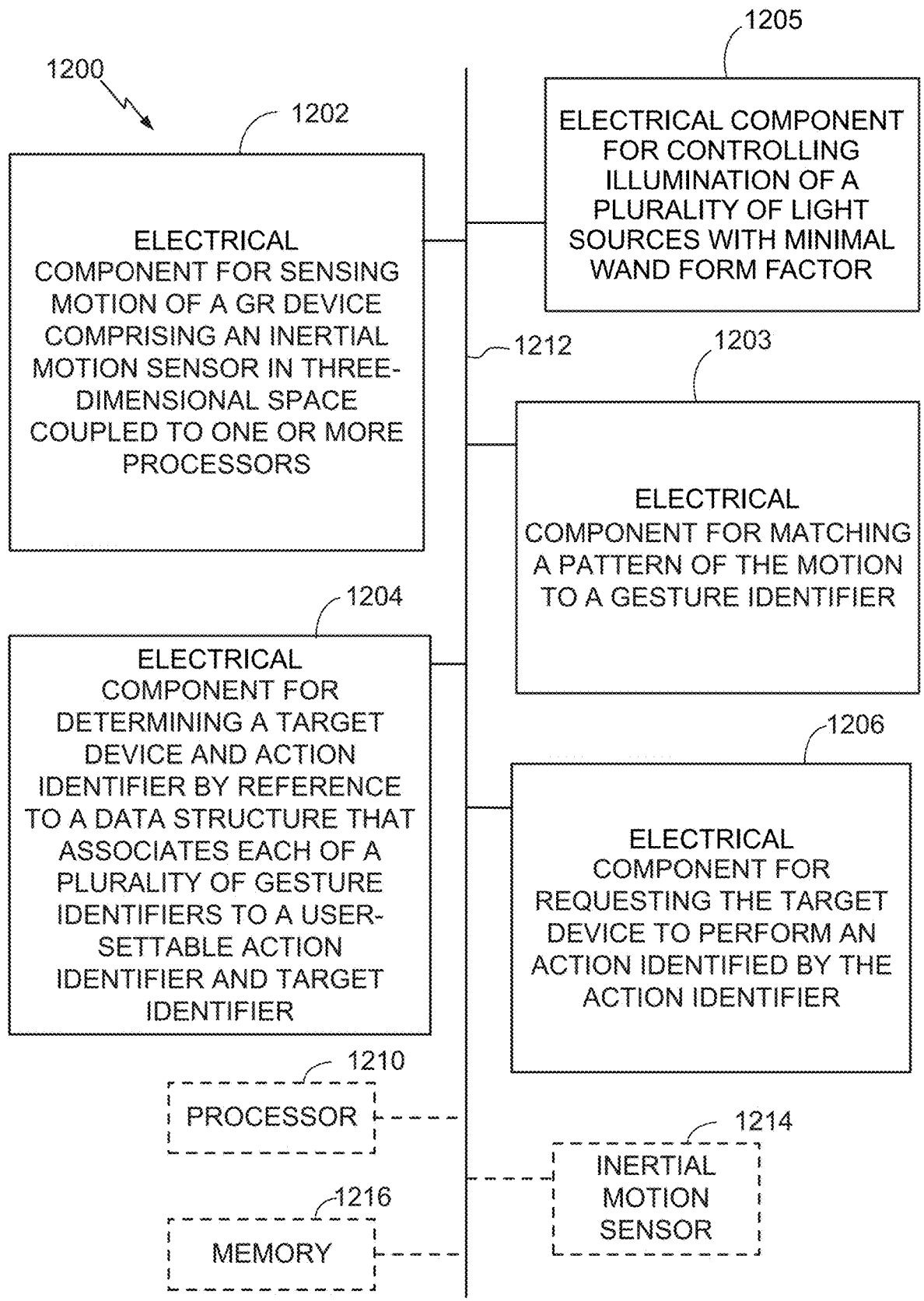
FIG. 12 is a conceptual block diagram illustrating components of an apparatus or system for providing a gesture-centric user interface for controlling one or more connected devices, and controlling illumination of a plurality of light sources of the exemplary GR device with minimal wand form factor.

FIG. 12 shows components of an apparatus or system 1200 for providing a gesture-centric user interface for multiple target devices as described herein, according to method 1100. As depicted, the apparatus or system 1200 may include functional blocks that can represent functions implemented by a processor, software, or combination thereof (e.g., firmware).

The apparatus or system 1200 may comprise an electrical component 1202 for sensing motion of a GR device comprising an inertial motion sensor in three-dimensional space coupled to one or more processors. The component 1202 may be, or may include, a means for said sensing. Said means may include the processor 1210 coupled to the memory 1216, and to the inertial motion sensor 14, the processor executing an algorithm based on program instructions stored in the memory. Such algorithm may include a sequence of more detailed operations, for example, method 700 as described in connection with FIG. 7.

The apparatus or system 1200 may further comprise an electrical component 1203 for matching a pattern of the motion to a gesture identifier, e.g., recognizing the gesture. The component 1203 may be, or may include, a means for said matching or recognizing. Said means may include the processor 1210 coupled to the memory 1216, the processor executing an algorithm based on program instructions stored in the memory. Such algorithm may include a sequence of more detailed operations, for example, method 804 as described in connection with FIG. 8B.

The apparatus or system 1200 may further comprise an electrical component 1204 for determining a target device and action identifier by reference to a data structure that associates each of a plurality of gesture identifiers to a user-settable action identifier and target identifier. The component 1204 may be, or may include, a means for said matching. Said means may include the processor 1210 coupled to the memory 1216 containing a library data structure, the processor executing an algorithm based on program instructions stored in the memory. Such algorithm may include a sequence of more detailed operations, for example, the method 800 described in connection with FIG. 8A.

The apparatus or system 1200 may further comprise an electrical component 1205 for controlling an illumination of a plurality of light sources with minimal wand form factor. The component 1205 may be, or may include, a means for said controlling. Said means may include the processor 1210 coupled to the memory 1216, and to a network interface device, the processor executing an algorithm based on program instructions stored in the memory. Such algorithm may include a sequence of more detailed operations, for example, the method 1500 described hereinafter in connection with FIG. 15.

The apparatus or system 1200 may further comprise an electrical component 1206 for requesting the target device to perform an action identified by the action identifier. The component 1206 may be, or may include, a means for said requesting. Said means may include the processor 1210 coupled to the memory 1216, and to a network interface device, the processor executing an algorithm based on program instructions stored in the memory. Such algorithm may include a sequence of more detailed operations, for example, the method 900 described in connection with FIG. 9.

The apparatus 1200 may optionally include a processor module 1210 having at least one processor, in the case of the apparatus 1200 configured as a data processor. The processor 1210, in such case, may be in operative communication with the modules 1202-1206 via a bus 1212 or other communication coupling, for example, a network. The processor 1210 may initiate and schedule the processes or functions performed by electrical components 1202-1206. The electrical components 1202-1206 may also be referred to as circuits or circuitry.

In related aspects, the apparatus 1200 may include a network interface module (not shown in FIG. 12, shown in FIG. 1) operable for communicating with a targeted clients and network resources over a computer network. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1206, and subcomponents thereof, or the processor 1210, or the any method or process described herein. The memory module 1216 may retain instructions for executing functions associated with the modules 1202-1206. While shown as being external to the memory 1216, it is to be understood that the modules 1202-1206 can exist within the memory 1216.

Figures 13C, 13D:
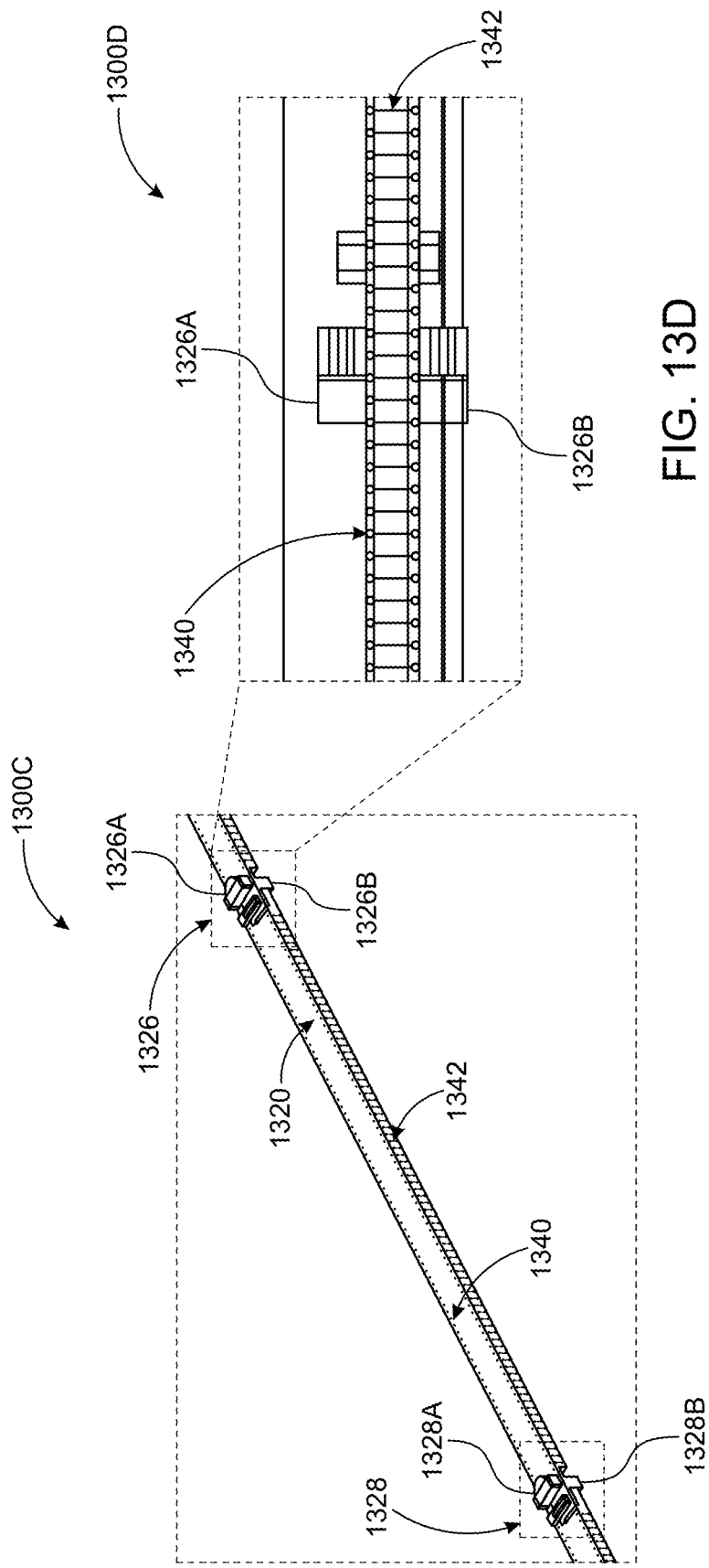
FIG. 13C is a diagram illustrating a perspective view of a portion of the PCB of the exemplary GR device, in accordance with various exemplary embodiments of the disclosure.
FIG. 13D is a diagram illustrating a side view of the portion of the PCB of the exemplary GR device, in accordance with various exemplary embodiments of the disclosure.

FIG. 13A is a diagram illustrating an external view of an exemplary GR device 1300 and components thereof, in accordance with various exemplary embodiments of the disclosure. FIG. 13A is described in conjunction with FIGS. 13B to 13D. FIG. 13B depicts a diagram illustrating a PCB 1310 of the exemplary GR device 1300 and components thereof, in accordance with various exemplary embodiments of the disclosure. FIG. 13C is a diagram illustrating a perspective view of a portion 1320 of the PCB 1310 of the exemplary GR device 1300, in accordance with various exemplary embodiments of the disclosure. FIG. 13D is a diagram illustrating a side view of the portion 1320 of the PCB 1310 of the exemplary GR device 1300, in accordance with various exemplary embodiments of the disclosure.

With reference to FIG. 13A, there is shown a diagram that illustrates an external view 1300A of the exemplary GR device 1300 and components thereof, in accordance with an embodiment of the disclosure. With reference to FIG. 13A, there is shown the external view 1300A of the exemplary GR device 1300, such as an interactive wand or a smart wand. The external view 1300A depicts an outer shell 1302 that comprises a handle 1304 and a shaft 1306. The outer shell 1302 includes various portions, such as opaque portions 1302A, transparent portions 1302B, and/or translucent portions 1302C, that overall provide a classic, authentic, and dynamic appearance to the exemplary GR device 1300. The handle 1304 may be grasped by the hand of the user 99, while the shaft 1306 may provide a form factor of a wand tip extending outward from the handle 1304.

The opaque portions 1302A span the majority of the outer shell 1302 of the exemplary GR device 1300 and mask the non-illuminating components of the exemplary GR device 1300, and also add to the aesthetic appeal of the exemplary GR device 1300. The transparent portions 1302B may be positioned preferably at the tip or other locations of the exemplary GR device 1300 where a bright illumination is required when the exemplary GR device 1300 is in the active state. On the other hand, the translucent portions 1302C may be positioned above the handle 1304, at the base, and along the length of the shaft 1306 of the exemplary GR device 1300 where a diffused and subtle illumination is required when the exemplary GR device 1300 is in the active state. The transparent portions 1302B and the translucent portions 1302C may illuminate in multi-colors when the user 99 activates the exemplary GR device 1300 and subsequently provides gestures to perform a specific action, such as interacting with smart devices at home, franchise locations, events, or bespoke enchanted items, thereby providing a spellcasting and magical experience to the user 99. The positions of the transparent portions 1302B and the translucent portions 1302C of the outer shell 1302 may correspond to positions of the underneath illuminating components mounted on a printed circuit board (PCB), such as a PCB 1310, as illustrated in FIG. 13B. In other words, the transparent portions 1302B and the translucent portions 1302C of the outer shell 1302 are positioned in such a manner that when the PCB 1310 is secured inside the outer shell 1302, the transparent portions 1302B and the translucent portions 1302C appear to be mounted on the top of the illuminating components of the PCB 1310 for maximum illumination.

In accordance with an embodiment, the exemplary GR device 1300 may be a wireless interactive wand or a smart wand configured to communicate wirelessly via radio frequency (RF) or infrared (IR) communication mode with other devices by utilizing power generated by the power storage unit 110. In accordance with another embodiment, the exemplary GR device 1300 may be an interactive wand configured to illuminate at a plurality of sections by utilizing power generated by the power storage unit 110. In accordance with yet another embodiment, the exemplary GR device 1300 may be an interactive wand that may include exemplary circuits 1316 (FIG. 13B) configured to generate haptic feedback by utilizing power generated by the power storage unit 110. In an exemplary scenario, one of the exemplary circuits 1316 may correspond to an eccentric rotating mass (ERM) motor driven by a linear motor controlled by an on-board microcontroller, such as the controller 106, which is also a BLE radio. For example, the exemplary GR device 1300 may light-up, vibrate and/or buzz at climactic movements while watching a movie or a show. In accordance with yet another embodiment, the exemplary GR device 1300 may communicate with an enchanted object, via an external electronic device (such as a mobile device), without use of a router. In certain embodiments, the external electronic device comprises a gesture recognition engine (not shown) for classifying the gestures by type and associating the action identifiers and gesture types. In other embodiments, the exemplary GR device 1300 may comprise the gesture recognition engine that may be executed by the exemplary GR device 1300 or via connection to the cloud.

It may be noted that the form factor of the exemplary GR device 1300 in accordance with the external view 1300A is provided merely for exemplary purposes and should not be construed to limit the scope of the disclosure. Notwithstanding, other suitable form factors of the exemplary GR device 1300 may be possible for being held, moved through the air, worn and/or carried by movements of the extremities of the user 99. Each form factor of the exemplary GR device 1300 may define and prescribe a particular shape, size, pattern, material, and other physical specifications, without any deviation from the scope of the disclosure.

Figure 14A:
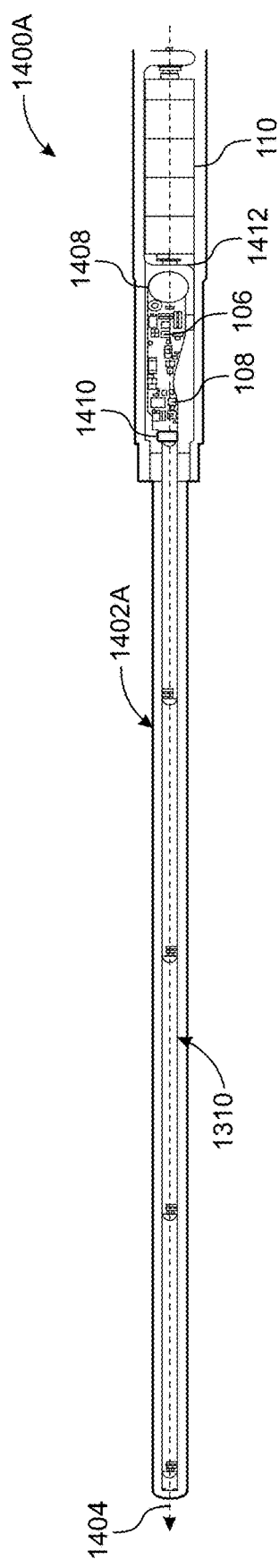
FIG. 14A to 14C are diagrams illustrating different types of the exemplary GR devices with same PCB, in accordance with various exemplary embodiments of the disclosure.
Figure 14B:
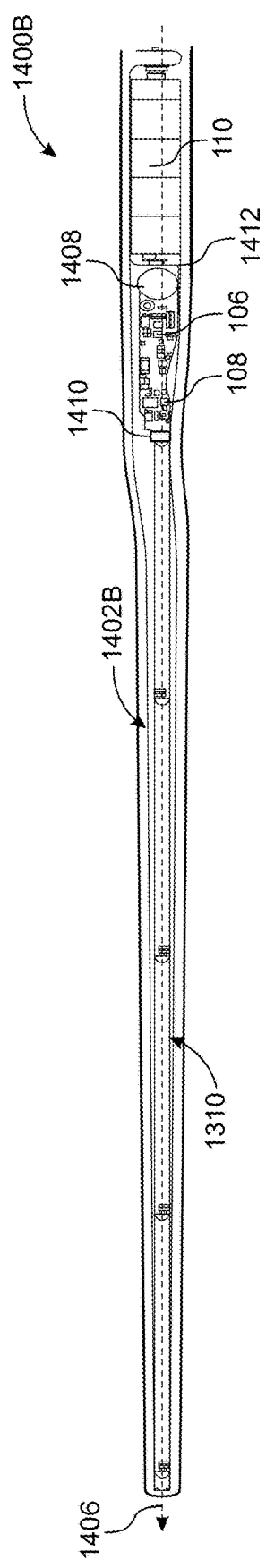
Figure 14C:
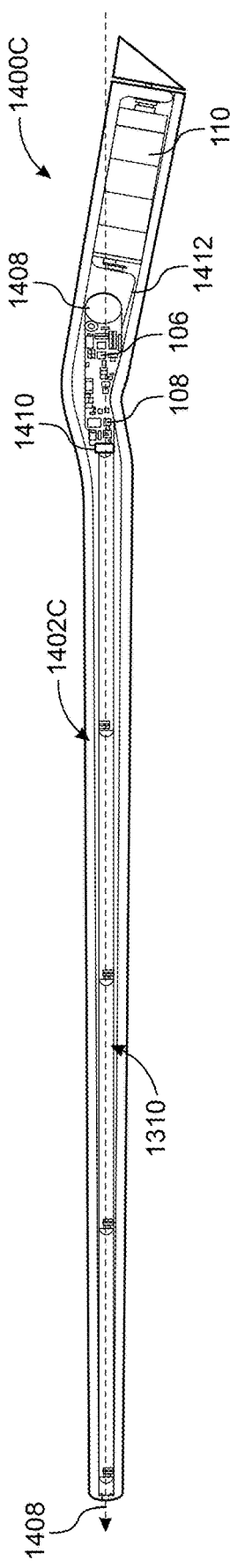

With reference to FIG. 13B, there is depicted a perspective view 1300B of the PCB 1310 of the exemplary GR device 1300. The PCB 1310 comprises a first unit 1312 and a second unit 1314. The first unit 1312 may correspond to the base unit (or the handle 1304) configured to be grasped by hand of the user 99. The first unit 1312 may include active electronic components, such as the controller 106, the IMU 108 and the power storage unit 110 (e.g., a rechargeable battery), in addition to a vibrator motor, a capacitive touch sensor, and a flex printed circuit (FPC), as illustrated in FIGS. 14A to 14C. The second unit 1314 may correspond to the elongate unit (or the shaft 1306) that extends outward from the first unit 1312. The second unit 1314 may include a plurality of light sources, for example an IR LED 1322, a first pair of LEDs 1324 to a fifth pair of LEDs 1332, and associated capacitors and resistors (not shown). One of the plurality of light sources, such as a base LED 1334, may be mounted at the base of the first unit 1312. The IR LED 1322 may be mounted at the tip of the second unit 1314. The ten LEDs corresponding to the five pairs of LEDs may be right-angled RGB LEDs mounted on the top and bottom surfaces of the second unit 1314. The base LED 1334 may be an upright RGB LED.

In accordance with an embodiment, the first unit 1312 and the second unit 1314 may be configured to have a minimal wand form factor due to substantially high aspect ratio of the PCB 1310. In accordance with an embodiment of the present disclosure, the PCB 1310 may have a substantially high aspect ratio that results in a long and thin rigid circuit board. The aspect ratio may be defined based on a ratio of the length 'L' of the PCB 1310 versus the width 'W' of the PCB 1310. The term "substantially high aspect ratio" may correspond to an aspect ratio that exceeds a threshold value. In accordance with an embodiment, the threshold value may correspond to at least 70 percent difference between length 1' and width 'W' of the PCB 1310. Accordingly, for such a PCB 1310, the range of the width may be less than a centimetre, and the range of the length may be between 12 inches and 18-and-a-half inches. For exemplary purposes, the aspect ratio of the PCB 1310 may be one-third of an inch by 12 inches. Such a high aspect ratio of the PCB 1310 may be achieved by employing a technique that leverages the standard fabrication process for PCB construction and using a mechanical rigidity. Accordingly, a long and thin PCB, such as the PCB 1310, may be constructed that is rigid and doesn't flop around when used by the user 99.

Accordingly, the resultant dimensions of the proposed exemplary GR device 1300, dictated by the PCB 1310 having the substantially high aspect ratio, are highly compact and minimalistic. The resultant dimensions may be also referred to as a minimal wand form factor. For example, as illustrated in FIG. 13B, the thickness of the exemplary GR device 1300 at the tip may be T1, such as 5.5 mm. At the base of the shaft 1306, the thickness may be T2, such as 6 mm, and at the top of the handle 1304, the thickness may be T3, such as 10 mm. Finally, at the base of the handle 1304, the thickness may be T4, such as 12.5 mm. Further, the PCB 1310 may have a thickest width may be approximately 0.8 cm and the thinnest width may be approximately 3.2 mm. It may be noted that the above minimalistic dimensions are for exemplary purposes, and there may be slight variations depending on the design, aesthetics, and the material of the outer shell 1302 of the exemplary GR device 1300.

In accordance with an embodiment, the minimal wand form factor may have various attributes. For example, a first attribute for the minimal wand form factor may correspond to a minimum number of electronic components mounted on the second unit 1314 as compared to the first unit 1312. For example, all the active electronic components, such as the controller 106, the IMU 108, the power storage unit 110 (e.g., a rechargeable battery), a vibrator motor, and the like, are mounted on the first unit 1312. Only the plurality of light sources, for example the IR LED 1322, the first pair of LEDs 1324 to the fifth pair of LEDs 1332, and the base LED 1334, and associated capacitors and resistors are mounted on the second unit 1314. In another example, a second attribute for the minimal wand form factor may correspond to usage of electric components (such as RGB LEDs, IR LED, and microcontrollers) with minimum complexity and cost. In other words, all the electrical components used are very simple and less costly in contrast to the complex, costly and bulky components, such as light pipes, optical lenses, diffusers, and individually addressable LEDs.

In accordance with an embodiment, as illustrated in FIG. 13B, the plurality of light sources may include multiple right-angled LEDs (or edge-fire LEDs) facing towards the tip of the second unit 1314 to illuminate the cavity of the exemplary GR device 1300. In accordance with an embodiment, the multiple right-angled LEDs may be mounted as pairs of light sources on both top and bottom surfaces of the second unit 1314. For example, the first pair of LEDs 1324 may be mounted proximal to the tip of the second unit 1314. The second pair of LEDs 1326 follows the first pair of LEDs 1324 towards the handle 1304. The third pair of LEDs 1328 and a fourth pair of LEDs 1330 follow the second pair of LEDs 1326. The fifth pair of LEDs 1332 may be mounted proximal to the handle 1304 of the second unit 1314. One LED of each pair, such as 1324A to 1332A, may be mounted at the top surface of the second unit 1314. Other LED of each pair, such as 1324B to 1332B, may be mounted at the bottom surface of the second unit 1314. The IR LED 1322 may be side-mounted on the tip of the second unit 1314. The base LED 1334 may be mounted at the base of the handle 1304.

In accordance with an embodiment, the first pair of LEDs 1324 to the fifth pair of LEDs 1332, and the base LED 1334 may be RGB LEDs (each having three channels (Red, Green, Blue)) and the second unit 1314 may accommodate twelve channels. Thus four groups of LEDs may be formed. For example, the first pair of LEDs 1324 may form a first group of LEDs. The second pair of LEDs 1326 and the third pair of LEDs 1328 may form a second group of LEDs. The fourth pair of LEDs 1330 and the fifth pair of LEDs 1332 may form a third group of LEDs. Finally, the base LED 1334 may form the fourth group of LEDs. Such a formation of four groups of LEDs may illuminate in different colors at the same time. In certain cases, the different colored channels may mix in different intensities to produce a variety of different colors based on additive color mixing. Such multicolor effect may provide an animated lighting effect to the exemplary GR device 1300 and provides a magical experience to the user 99. In accordance with another embodiment, each of the first pair of LEDs 1324 to the fifth pair of LEDs 1332 and the base LED 1334 may be single colored LEDs (each having a single channel). Consequently, each of the first pair of LEDs 1324 to the fifth pair of LEDs 1332 and the base LED 1334 may illuminate the entire second unit 1314 in a single color.

With reference to FIG. 13C, there is shown the second pair of LEDs 1326 and the third pair of LEDs 1328 mounted on both top and bottom surfaces of the portion 1320 of the second unit 1314. More specifically, LEDs 1326A and 1328A from the second and the third pairs of LEDs 1326 and 1328 respectively, may be mounted on the top of the portion 1320 of the second unit 1314. Further, other LEDs 1326B and 1328B from the second and the third pairs of LEDs 1326 and 1328 respectively, may be mounted on the bottom of the portion 1320 of the second unit 1314.

In accordance with an embodiment, a first location of a first light source from a pair of light sources mounted on the top surface is above a second location of a second light source of the pair of light sources mounted on the bottom surface for uniform illumination. For example, the first location of the LED 1326A from the second pair of LEDs 1326 mounted on the top of the portion 1320, is exactly above the second location of the other LED 1326B from the second pair of LEDs 1326 mounted on the bottom of the portion 1320. Such an arrangement may ensure brighter and uniform illumination of the exemplary GR device 1300.

In accordance with an embodiment, as illustrated in FIGS. 13C and 13D, there is illustrated the perspective view 1300C and a side view 1300D (of an exploded portion of a location where the second pair of LEDs 1326 is mounted) respectively, of the portion 1320 of the second unit 1314. The perspective view 1300C and the side view 1300D illustrate a plurality of vertical interconnect access (via) structures 1342 along the side edges the second unit 1314. The via structures 1342 on the second unit 1314 of the PCB 1310 may correspond to a conducting pathway between two or more adjacent layers, such as eight layers, of the second unit 1314 by drilling small holes 1340 that goes through the two or more adjacent layers of the second unit 1314. In accordance with an embodiment, the small holes 1340 may be plated with copper that form electrical connection through the insulation that separates the two or more adjacent layers. Such a connection of the two or more adjacent layers of the PCB 1310 makes it possible to reduce the size of the PCB 1310, as the two or more adjacent layers can be stacked. The via structures 1342 and the copper fills may provide a miniaturized ladder pattern as illustrated in the perspective view 1300C and the side view 1300D of the portion 1320. Such a miniaturized ladder pattern formed by the via structures 1342 and the copper fills along the side edges of the second unit 1314 may correspond to a structural attribute of the second unit 1314. Such a miniaturized ladder pattern formed by the via structures 1342 and the copper fills along edges of the second unit 1314 is critical toward minimizing any potential bend in the PCB 1310, thus adding to the strength and rigidity of the second unit 1314.

In accordance with an embodiment, power and light source control (i.e. the LED control) signals may be routed to the plurality of light sources between the miniaturized ladder pattern formed by the via structures 1342 along the side edges of the second unit 1314. The power and the LED control signals provided to the plurality of light sources may be controlled by the controller 106. Accordingly, portions of the outer shell 1302, such as the transparent portions 1302B, and/or a translucent portions 1302C, mounted on the second unit 1314 illuminate based on the controlled illumination of the plurality of light sources by the controller 106. The controller 106 may be configured to control illumination of the plurality of light sources mounted on the second unit 1314 of the PCB 1310 based on assertion signals generated based on a touch input provided by hand of the user 99 or a gesture input provided by a specific pattern of movement of the exemplary GR device 1300 by the user 99.

Figure 13E:
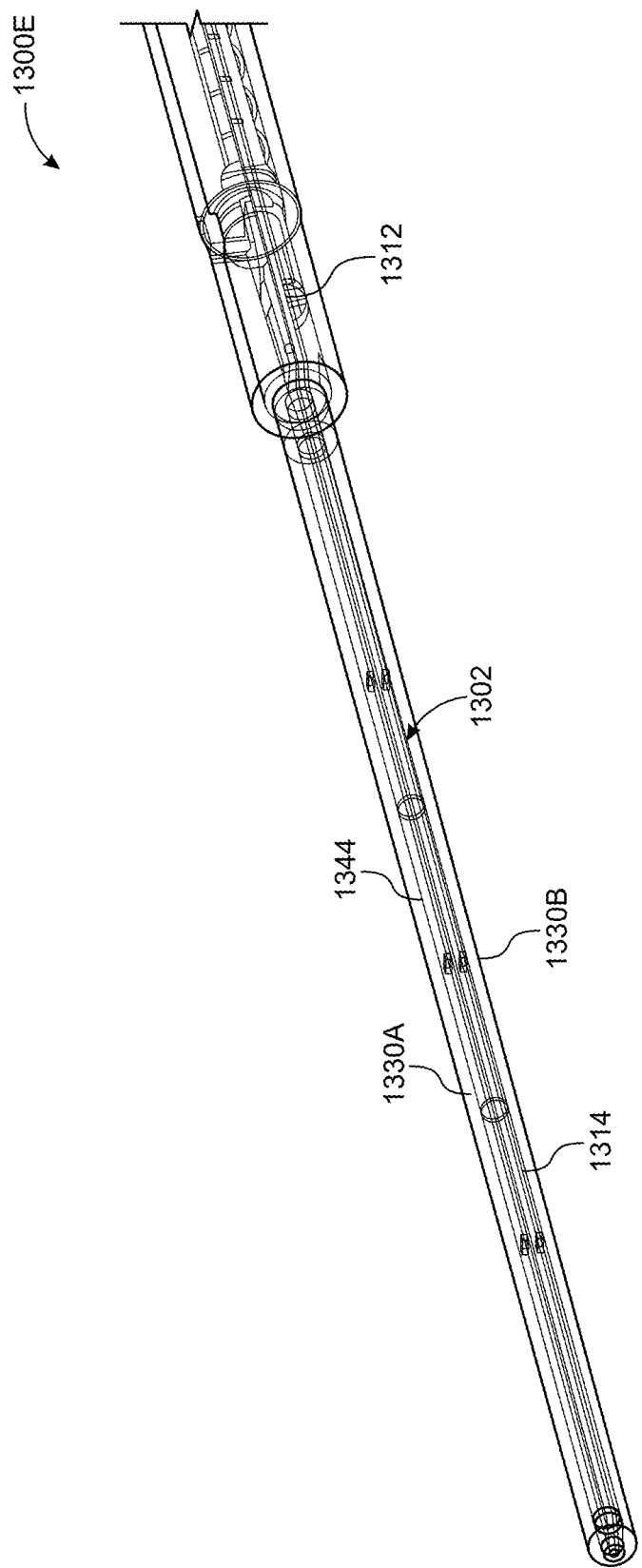
FIG. 13E is a diagram illustrating an outer shell of a second unit of the PCB of the exemplary GR device, in accordance with various exemplary embodiments of the disclosure.

FIG. 13E is a diagram illustrating a perspective view 1300E of the outer shell 1302 of the second unit 1314 of the PCB 1310 of the exemplary GR device 1300, in accordance with an embodiment of the disclosure.

As described in FIGS. 13C and 13D, the structural attribute of the second unit 1314 lends to the rigid strength of the second unit 1314. Additionally, the rigid strength of the second unit 1314 may be based on the outer shell 1302 of the second unit 1314, as illustrated in FIG. 13E. In certain embodiments, the shape of the outer shell 1302 may be of any regular shape that defines the shape of the exemplary GR device 1300. In other embodiments, the shape of the outer shell 1302 may be of a regular shape on which artistic patterns are embedded, sculpted, or embossed. In an exemplary scenario, the outer shell 1302 may be of a cylindrical shape that can lend maximum possible rigidity to the exemplary GR device 1300. From a design standpoint, it allows to minimize the diameter of the outer shell 1302 down to, for example 0.6 mm, along the shaft 1306 for a wide variety of wand styles.

In accordance with an embodiment, as illustrated in FIG. 13E, the outer shell 1302 may be formed by injection moulding two clamshell side members, i.e. a top half member 1336A and a bottom half member 1336B. Injection moulding is a process of melting malleable plastic pellets (thermosetting/thermoplastic polymers), and injecting at pressure into a mould cavity, which fills and solidifies to form the clamshell side members of the outer shell 1302. Into one of the clamshell side members, for example, the bottom half member 1336B, the PCB 1310 may be screw-mounted and the two clamshell side members, i.e. the top half member 1336A and the bottom half member 1336B, may be secured together with the PCB 1310 and other electronic components inside. Once secured, the boundaries of the two clamshell side members may be ultrasonically welded with additional plastic elements (such as gems and other aesthetic features) to form a continuous member. In accordance with another embodiment, the complete body of the outer shell 1302 may be injection moulded. The PCB 1310 may be slid into the middle of the outer shell 1302, thus formed. The outer shell 1302 and the PCB 1310 may be secured together by a fastening mechanism, and ultrasonically welded to form a continuous translucent member with a regular shape. One example of such fastening mechanism may be coupling by a press-and-fit clip. However, other similar fastening mechanisms may also be deployed without deviation from the scope of the disclosure. Further, the above cited example of ultrasonically welding to secure the outer shell 1302 and the PCB 1310 together to form the continuous member should not be construed to be limiting, and other techniques (though providing different strengths and yields), such as adhesives or tongue and groove clips, may also be used without deviation from the scope of the disclosure.

In accordance with an embodiment, light rays generated by the five pairs of LEDs on the top and bottom surfaces of the second unit 1314 may undergo continuous bouncing between inner walls of the outer shell 1302 and top and bottom surfaces of the second unit 1314. Such a continuous bouncing of the light rays between inner walls of the outer shell 1302 and top and bottom surfaces of the second unit 1314 results in maximum diffusion of the light rays and thereby, maximum illumination. In accordance with another embodiment, the light rays generated by the five pairs of LEDs on the top and bottom surfaces of the second unit 1314 may enter into the material (i.e., plastic) of the outer shell 1302 and continuously bounce inside the inner and outer walls of the outer shell 1302. Such a continuous bouncing of the light rays results in uniform illumination of the outer shell 1302.

In accordance with an embodiment, to address translucency and opaqueness of the outer shell 1302, a technique of half vapour deposition may be used for reflection of light to increase the internal bouncing of the light rays multiple times. Further, a discontinuous coating technique of NCVM (non-conductive vapour metallization) may be adopted to plate the outer shell 1302 and obtain metal-like appearance.

In accordance with an embodiment, each LED from the first pair of LEDs 1324 to the fifth pair of LEDs 1332 may be configured to illuminate a corresponding hollow channel (from a plurality of hollow channels 1344) that is a portion of the outer shell 1302. The light emitted by the LED from the first pair of LEDs 1324 to the fifth pair of LEDs 1332 may be absorbed by the corresponding hollow channels 1344 and maximally illuminate the outer shell 1302.

In accordance with an embodiment, plastic from each hollow channel from the plurality of hollow channels 1344 may be extended from the inner wall of the plastic towards each LED from the first pair of LEDs 1324 to the fifth pair of LEDs 1332 and then face-off just before the LED. Such extensions corresponding to each LED, both from the top and the bottom sides, may be integrated with the outer shell 1302. Based on the extensions, light rays emitting from the LED may be transferred to the outer shell 1302 more efficiently based on the mechanism of total internal reflection that allows the light to enter, but not escape from the plastic material of the outer shell 1302.

In accordance with an embodiment, a solder mask may be applied to the top and bottom surfaces of the second unit 1314. In accordance with an exemplary scenario, the color of the solder mask may be white or bright white solder mask that may increase the internal illumination. The solder mask, also referred to as solder stop mask or solder resist, may be a thin lacquer-like layer of polymer that may be applied to the copper traces of the PCB 1310 for protection against oxidation and to prevention of solder bridges from forming between closely spaced solder pads. Some types of the solder mask may correspond to epoxy liquid that may be silkscreened through the pattern onto the PCB 1310. Other types may correspond photo imagable solder masks (DFSMs).

In accordance with an embodiment, the outer surface of the outer shell 1302 may be frosted and textured such that light rays are leaked and diffused at the outer surface of the outer shell 1302. The outer shell 1302 may be formed using a polymer blend with one of a first, a second or a third variation. In an embodiment, the first variation of the polymer blend may be clear and frosted. In another embodiment, the second variation of the polymer blend is 50-90% translucent with a color tint. In yet another embodiment, the third variation of the polymer blend is 50-90% translucent and mixed with silicon powder to increase light diffusion.

In accordance with an embodiment, a degree of translucency of the outer shell 1302 may be based on the material that is utilized for the outer shell 1302 and coatings of paint, such as NCVM coating, applied on the outer surface of the outer shell 1302. For example, at the tip of the outer shell 1302, the coating is lighter to provide higher transparency and lesser translucency as compared to rest of the body of the outer shell 1302. Due to such a thin coating, brightness of an LED may be increased and 360-degree illumination may be provided. Over the areas of the surface of the outer shell 1302 (that correspond to the opaque portions 1302A illustrated in FIG. 13A), such as the sculpted portion or other portion underneath which direct illumination by LEDs is not present, thick coatings of the paint may be applied to provide opaqueness to the surface of the outer shell 1302. Other areas of the outer shell 1302 (that correspond to the transparent portions 1302B or the translucent portions 1302C as illustrated in FIG. 13A) may correspond to the portions underneath which direct illumination is present or portions of the painted surface of the outer shell 1302 from which the light illuminates out. Over all such areas of the outer shell 1302, lighter coatings of the paint may be applied.

In accordance with an embodiment, the combination of the diffusing property of the outer shell 1302 around the tip of the shaft 1306, the type of the coating on the surface of the outer shell 1302, and the incorporation of the first pair of LEDs 1324 on the top and bottom surface of the tip of the shaft 1306, creates a bloom radiance around the tip of the outer shell 1302. Such a bloom radiance, when the first pair of LEDs 1324 illuminates, creates a dramatic effect when the user 99 activates the exemplary GR device 1300, provides a touch input by hand, or a provides a gesture input by moving the exemplary GR device 1300 in a specific pattern.

FIGS. 14A to 14C are diagrams illustrating top views 1400A, 1400B, and 1400C respectively, of different styles of the exemplary GR device 1300 with same PCB 1310, in accordance with various embodiments of the disclosure. Such scalability to the different styles of the exemplary GR device 1300 may be dictated by differently manipulated board outlines that incorporate the same PCB 1310 with the substantially high aspect ratio, as described in FIGS. 13A and 13B.

In accordance with various embodiments, a boundary outline of the exemplary GR device 1300 may be determined based on a combination of a contour of the first unit 1312 and the second unit 1314 of the PCB 1310 and a FPC 1412. The contour of the first unit 1312 and the second unit 1314 may be one of a straight contour, an offset contour or a curved contour based on the one or more key contour elements. The one or more key contour elements may correspond to an inner curvature, a corner radius, and a profile of the PCB 1310. Such a combination may facilitate three styles of the exemplary GR device 1300, for example, a first exemplary GR device 1402A (straight wand design), a second exemplary GR device 1402B (slightly offset wand design), and a third exemplary GR device 1402C (curved wand design), as illustrated in FIGS. 14A to 14C.

With reference to FIG. 14A, there is shown a top view 1400A of the first exemplary GR device 1402A and a first longitudinal axis 1404. The boundary outline of the handle 1304 of the first exemplary GR device 1402A may be symmetrical about the first longitudinal axis 1404, therefore may be referred to as, for example a straight wand. The first exemplary GR device 1402A may include the PCB 1310 coupled to the power storage unit 110 via the FPC 1412 along the first longitudinal axis 1404.

With reference to FIG. 14B, there is shown a top view 1400B of the second exemplary GR device 1402B and a second longitudinal axis 1406. The boundary outline of the handle 1304 of the second exemplary GR device 1402B may be slightly non-symmetrical about the second longitudinal axis 1406, therefore may be referred to as, for example a slightly offset wand. The second exemplary GR device 1402B may include the PCB 1310 coupled to the power storage unit 110 via the FPC 1412 at a first range of curvature with respect to the second longitudinal axis 1406.

With reference to FIG. 14C, there is shown a top view 1400C of the third exemplary GR device 1402C and a third longitudinal axis 1408. The boundary outline of the handle 1304 of the third exemplary GR device 1402C may be substantially non-symmetrical about the third longitudinal axis 1408, therefore may be referred to as, for example a curved wand. In various examples, the curvature of the third exemplary GR device 1402C may vary, for example, in one use case, the curvature may be 45 degrees, while in other use cases, the curvature may vary from zero degree to 30 degrees. The third exemplary GR device 1402C may include the PCB 1310 coupled to the power storage unit 110 via the FPC 1412 at a second range of curvature with respect to the third longitudinal axis 1408.

As illustrated in all the three styles of the exemplary GR device 1300, all the active electronic components, such as the controller 106, the IMU 108, the power storage unit 110 (e.g., a rechargeable battery), a vibrator motor 1408, a capacitive touch sensor 1410, the FPC 1412, and the like, in addition to the base LED 1334 are mounted on the first unit 1312. Only the plurality of light sources, that are limited in number, for example the first pair of LEDs 1324 to the fifth pair of LEDs 1332, in addition to the IR LED 1322 and associated capacitors and resistors are mounted on the second unit 1314. Mounting of any other active electrical component on the second unit 1314 may result in blocking of the light emitted by one or more of the first pair of LEDs 1324 to the fifth pair of LEDs 1332.

In all the three styles of the exemplary GR device 1300, the electrical components are refrained to be placed in front of the first pair of LEDs 1324 to the fifth pair of LEDs 1332. Instead, all the electrical components are placed in the first unit 1312 without growing the dimensions of the handle 1304 for premium aesthetic wand designs. The FPC 1412 may leverage the key elements of the contour to optimally reposition the power storage unit 110 (e.g., a rechargeable battery) and other components on the flex.

Figure 15:
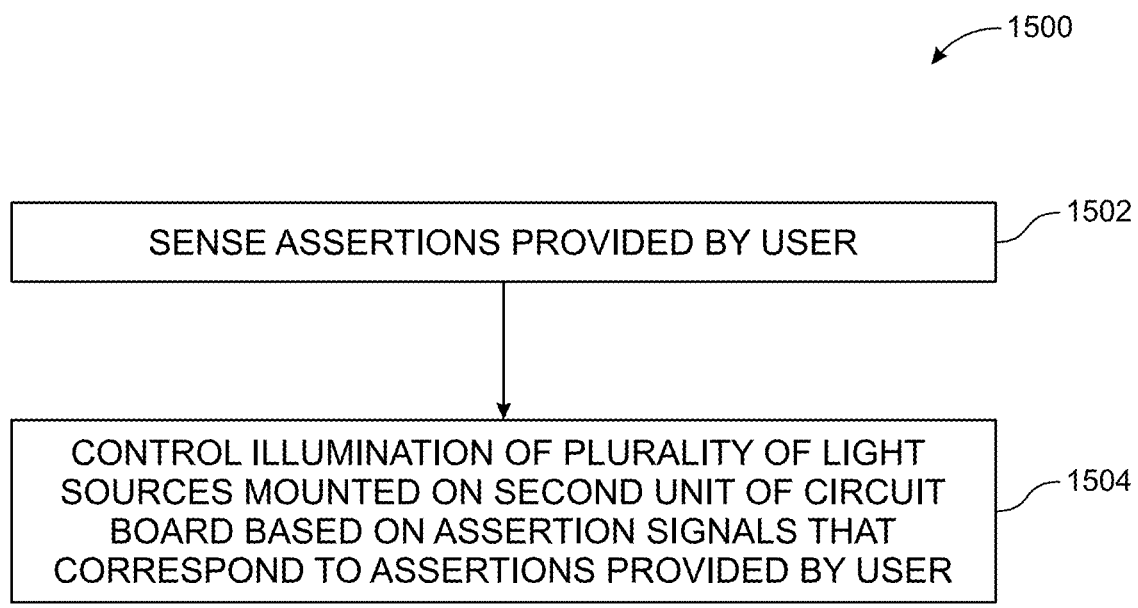
FIG. 15 shows a method for controlling illumination of a plurality of light sources of the exemplary GR device with minimal wand form factor, in accordance with an exemplary embodiment of the disclosure.

FIG. 15 shows a method 1500 for controlling illumination of a plurality of light sources of the exemplary GR device with minimal wand form factor, in accordance with an exemplary embodiment of the disclosure.

At step 1502, assertions, provided by the user 99, may be sensed. In accordance with an embodiment, the one or more sensors in the first unit 1312 of the exemplary GR device 1300 (or the three exemplary GR devices 1402A to 1402C) with minimal wand form factor, may be configured to sense the assertions provided by the user 99. In certain embodiments, the assertions may correspond to a touch input provided by hand of the user 99. The touch input may be provided when the user 99 grasps the handle 1304 of the exemplary GR device 1300. In such embodiments, a cap-touch sensor, such as the capacitive touch sensor 1410 (as shown in FIGS. 14A, 14B, and 14C), may be configured to sense various types of grips of the hand of the user 99 on the handle 1304. In other embodiments, the assertions may correspond to a gesture input, such as 3D motion data, provided by a specific pattern of movement of the exemplary GR device 1300 by the user 99. In such embodiments, the IMU 108 may be configured to sense the gesture input provided by the user. Corresponding to such assertions, the one or more sensors may generate assertion signals and communicate such assertion signals to the controller 106 via the bus 1212 or other means of communication coupling.

At step 1504, illumination of the plurality of light sources mounted on the second unit 1314 of the circuit board, such as the PCB 1310, may be controlled based on the assertion signals that correspond to the assertions provided by the user 99. In accordance with an embodiment, the controller 106 may be configured to control the illumination of the plurality of light sources mounted on the second unit 1314 of the PCB 1310 of the exemplary GR device 1300 (or the three exemplary GR devices 1402A to 1402C), based on the assertion signals that correspond to the assertions provided by the user 99. In certain embodiments, the controlled illumination of the plurality of light sources may correspond to perform additive color mixing, generating animated lighting effect, and the like.

The proposed solutions for the exemplary GR device 1300 provides various advantages, such as maximized brightness, enhanced rigidity and strength, reduced cost and higher scalability.

In case of existing toy wands, the brightness may not be optimal as there is a trade-off between the material of the outer plastic and the paint coatings. On the other hand, the proposed exemplary GR device 1300 incorporates half vapour deposition that may allow for a reflection of light to increase the bounce internally and address the translucency and opaqueness of the outer shell. Thus, NCVM coating is applied, which when applied by a half silvery method, provides the transparency and reflection that is required to increase the brightness of the exemplary GR device 1300.

Further, existing toy wands may use light pipes for illumination that have the light sources at one end that illuminate the entire electronic wand. Such layered pipes require separate illumination for each of the pipes, which results in such electronic wands compromising on rigidity and also becoming prohibitively expensive. In contrast, the proposed the exemplary GR device 1300 of the present disclosure incorporates a thin straw-like structure for the outer shell, due to which the proposed the exemplary GR device 1300 becomes lighter in weight, more rigid/strong, and lesser expensive.

Furthermore, existing toy wands only utilize straight PCBs without any contouring elements and exhibit limited features because of limited space on the first unit 1312 and the second unit 1314. On the contrary, the proposed exemplary GR device 1300 allows the user 99 to use the same internals across wide variety of wand designs, such as the straight wand, slightly offset wand and curved wand, while significantly reducing mass production costs.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

What is claimed is:

1. A gesture recognition (GR) device, comprising:
 a memory for storing instructions; and
 a processor for executing the instructions to perform a method, the method comprising:
  controlling illumination of a plurality of light sources mounted on a second unit of a circuit board based on assertion signals,
   wherein the circuit board comprises a first unit and the second unit,
   wherein the circuit board has an aspect ratio exceeding a threshold value,
   wherein the threshold value corresponds to at least 70 percent difference between length and width of the circuit board,
   wherein the first unit corresponds to a base unit configured to be grasped by hand of a user,
   wherein the second unit corresponds to an elongate unit that extends outward from the first unit, wherein the second unit is configured to have a minimal wand form factor, and wherein rigid strength of the second unit is based on at least a shape of an outer shell and a structural attribute of the second unit.

2. The GR device according to claim 1, wherein the outer shell mounted on the second unit illuminates based on the controlled illumination of the plurality of light sources.

3. The GR device according to claim 1, wherein a first attribute for the minimal wand form factor corresponds to a minimum number of electronic components mounted on the second unit as compared to the first unit.

4. The GR device according to claim 1, wherein a second attribute for the minimal wand form factor corresponds to usage of electric components with minimum complexity and cost.

5. The GR device according to claim 1, wherein the structural attribute of the second unit corresponds to a miniaturized ladder pattern formed by via structures and copper fills along edges of the second unit.

6. The GR device according to claim 5, wherein the method further comprising routing power signals to the plurality of light sources through the miniaturized ladder pattern along edges of the second unit.

7. The GR device according to claim 1, wherein light rays generated by the plurality of light sources undergo continuous bouncing between inner walls of the outer shell and top and bottom surfaces of the second unit to which a solder mask is applied, and wherein the continuous bouncing of the light rays results in maximum diffusion of the light rays and maximum illumination.

8. The GR device according to claim 1, wherein body of the outer shell is comprises two hollow translucent side members that are clam-shelled and secured together along with the second unit in middle by using a fastening mechanism, and wherein boundaries of the hollow translucent side members are ultrasonically welded to form a continuous translucent member with a regular shape.

9. The GR device according to claim 1, wherein body of the outer shell is injection moulded, slid onto the second unit, secured together by a fastening mechanism, and ultrasonically welded to form a continuous translucent member with a regular shape.

10. The GR device according to claim 1, wherein each light source from the plurality of light sources is configured to illuminate a corresponding hollow channel that is a portion of the outer shell.

11. The GR device according to claim 1, wherein outer surface of the outer shell is frosted and textured such that light rays are leaked and diffused at the outer surface of the outer shell.

12. The GR device according to claim 1, wherein the outer shell is formed using a polymer blend with one of a first, a second or a third variation, wherein the first variation of the polymer blend is clear and frosted, wherein the second variation of the polymer blend is 50-90% translucent with a color tint, and wherein the third variation of the polymer blend is 50-90% translucent and mixed with silicon powder to increase light diffusion.

13. The GR device according to claim 1, wherein the plurality of light sources correspond to right-angled light emitting diodes (LEDs) facing towards a tip of the second unit.

14. The GR device according to claim 1, wherein the plurality of light sources are mounted as pairs of light sources on both top and bottom surfaces of the second unit.

15. The GR device according to claim 14, wherein a first location of a first light source of a pair of light sources mounted on the top surface is above a second location of a second light source of the pair of light sources mounted on the bottom surface for uniform illumination.

16. The GR device according to claim 1, wherein a degree of translucency of the outer shell is based on material of the outer shell and coatings of paint applied on top and/or bottom surfaces of the outer shell.

17. The GR device according to claim 1, wherein a boundary outline of the GR device is determined based on a combination of a contour of the first unit and the second unit of the circuit board and a flex printed circuit, wherein the contour of the first unit and the second unit of the circuit board is one of a straight contour, an offset contour or a curved contour based on the one or more key contour elements, and wherein the one or more key contour elements correspond to an inner curvature, a corner radius, and a profile of the circuit board.

18. A circuit board, comprising:

a first unit that corresponds to a base unit configured to be grasped by hand of a user;

a second unit that corresponds to an elongate unit extends outward from the first unit, wherein the first unit and the second unit are configured to have a minimal wand form factor, wherein the first unit and the second unit form an integral unit having an aspect ratio exceeding a pre-defined threshold value, and wherein rigid strength of the second unit is based on at least a shape of an outer shell and a structural attribute of at least the second unit; and a plurality of light sources mounted on the second unit is configured to be illuminated based on assertion signals.

19. The circuit board according to claim 18, wherein the structural attribute of the second unit corresponds to a miniaturized ladder pattern along edges of the second unit formed by via structures and copper fills, wherein the illumination of the plurality of light sources is controlled by a controller, and wherein power and light source control signals are routed to the plurality of light sources between the miniaturized ladder pattern along edges of the second unit for the controlled illumination.

20. The circuit board according to claim 18, wherein light rays generated by the plurality of light sources undergo continuous bouncing between inner walls of the outer shell and surface of the second unit to which a solder mask is applied, and wherein the continuous bouncing of the light rays results in maximum diffusion of the light rays and maximum illumination.

* * * * *